(12) United States Patent
Aoki

(10) Patent No.: US 9,541,715 B2
(45) Date of Patent: Jan. 10, 2017

(54) OPTICAL MODULE, MANUFACTURING METHOD OF OPTICAL MODULE, AND OPTICAL DEVICE

(71) Applicant: FUJITSU LIMITED, Kawasaki-shi, Kanagawa (JP)

(72) Inventor: Tsuyoshi Aoki, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/723,819

(22) Filed: May 28, 2015

(65) Prior Publication Data

US 2015/0370015 A1 Dec. 24, 2015

(30) Foreign Application Priority Data

Jun. 19, 2014 (JP) ................. 2014-126150

(51) Int. Cl.
*G02B 6/12* (2006.01)
*G02B 6/42* (2006.01)
*G02B 6/32* (2006.01)

(52) U.S. Cl.
CPC ............ *G02B 6/4204* (2013.01); *G02B 6/423* (2013.01); *G02B 6/4239* (2013.01); *G02B 6/4249* (2013.01); *G02B 6/4257* (2013.01); *G02B 6/32* (2013.01); *Y10T 29/49828* (2015.01)

(58) Field of Classification Search
CPC ...... G02B 6/122; G02B 6/13; Y10T 29/49828
USPC .............................................. 385/14, 90–94
See application file for complete search history.

(56) References Cited

U.S. PATENT DOCUMENTS

| | | | | |
|---|---|---|---|---|
| 6,257,772 B1 * | 7/2001 | Nakanishi | ............ | G02B 6/4212 257/432 |
| 6,632,027 B1 * | 10/2003 | Yoshida | ............... | G02B 6/4277 385/88 |
| 6,944,377 B2 * | 9/2005 | Umebayshi | ........ | G02B 6/12002 385/49 |
| 6,947,638 B2 * | 9/2005 | Abe | ..................... | G02B 6/2931 385/14 |
| 7,013,055 B2 * | 3/2006 | Hayamizu | .......... | G02B 6/12007 385/131 |
| 7,254,300 B2 * | 8/2007 | Nishie | .................... | G02B 6/423 385/49 |

(Continued)

FOREIGN PATENT DOCUMENTS

JP H06-18728 1/1994
JP H07-120638 5/1995

(Continued)

*Primary Examiner* — Ryan Lepisto
*Assistant Examiner* — Guy Anderson
(74) *Attorney, Agent, or Firm* — Kratz, Quintos & Hanson, LLP

(57) ABSTRACT

An optical module includes: a first substrate configured to include an optical waveguide, and a first concave section provided over an end surface side of the optical waveguide; a resin configured to be disposed in the first concave section; an optical component configured to be disposed over the resin; and a second substrate configured to be jointed onto the first substrate, and to include a second concave section corresponding to the end surface in a surface facing the first concave section, the optical component being disposed between the resin and the second concave section.

19 Claims, 17 Drawing Sheets

(56) References Cited

U.S. PATENT DOCUMENTS

| | | | | |
|---|---|---|---|---|
| 7,336,905 B2* | 2/2008 | Pyo | ............... | G02B 6/4246 385/27 |
| 7,421,157 B2* | 9/2008 | Ide | ............... | G02B 6/4214 385/24 |
| 7,583,873 B2* | 9/2009 | Oki | ............... | G02B 6/1221 156/182 |
| 7,764,860 B2* | 7/2010 | Kodama | ............... | G02B 6/42 385/146 |
| 8,363,988 B2* | 1/2013 | Kim | ............... | G02B 6/43 385/14 |
| 8,774,568 B2* | 7/2014 | Han | ............... | G02B 6/4206 385/14 |
| 2001/0033722 A1* | 10/2001 | Okada | ............... | G02B 6/4212 385/94 |
| 2002/0196997 A1* | 12/2002 | Chakravorty | ............... | G02B 6/42 385/14 |
| 2003/0174998 A1* | 9/2003 | Shevchuk | ............... | G02B 6/3885 385/137 |
| 2004/0042739 A1* | 3/2004 | Maeno | ............... | G02B 6/32 385/89 |
| 2004/0177977 A1* | 9/2004 | Hansen | ............... | A01B 63/1013 172/2 |
| 2007/0019899 A1* | 1/2007 | Ohtsu | ............... | G02B 6/4214 385/14 |
| 2007/0286549 A1 | 12/2007 | Warashina | | |
| 2008/0175530 A1* | 7/2008 | Song | ............... | G02B 6/43 385/14 |
| 2009/0010603 A1* | 1/2009 | Sugioka | ............... | C08K 3/22 385/123 |
| 2009/0014633 A1* | 1/2009 | Sekikawa | ............... | G01J 1/02 250/226 |
| 2010/0002984 A1* | 1/2010 | Sato | ............... | G02B 6/30 385/14 |
| 2013/0004118 A1* | 1/2013 | Castagna | ............... | G02B 6/4214 385/14 |
| 2013/0313309 A1* | 11/2013 | Kitajima | ............... | H01L 21/64 228/180.5 |
| 2014/0143996 A1* | 5/2014 | Bhagavatula | ............... | G02B 3/0087 29/428 |
| 2014/0147078 A1* | 5/2014 | Bhagavatula | ............... | G02B 6/32 385/33 |
| 2015/0355409 A1* | 12/2015 | Yanagisawa | ............... | G02B 6/322 385/14 |

FOREIGN PATENT DOCUMENTS

| | | |
|---|---|---|
| JP | 2005-234052 A1 | 9/2005 |
| JP | 2006-10959 A1 | 1/2006 |

* cited by examiner

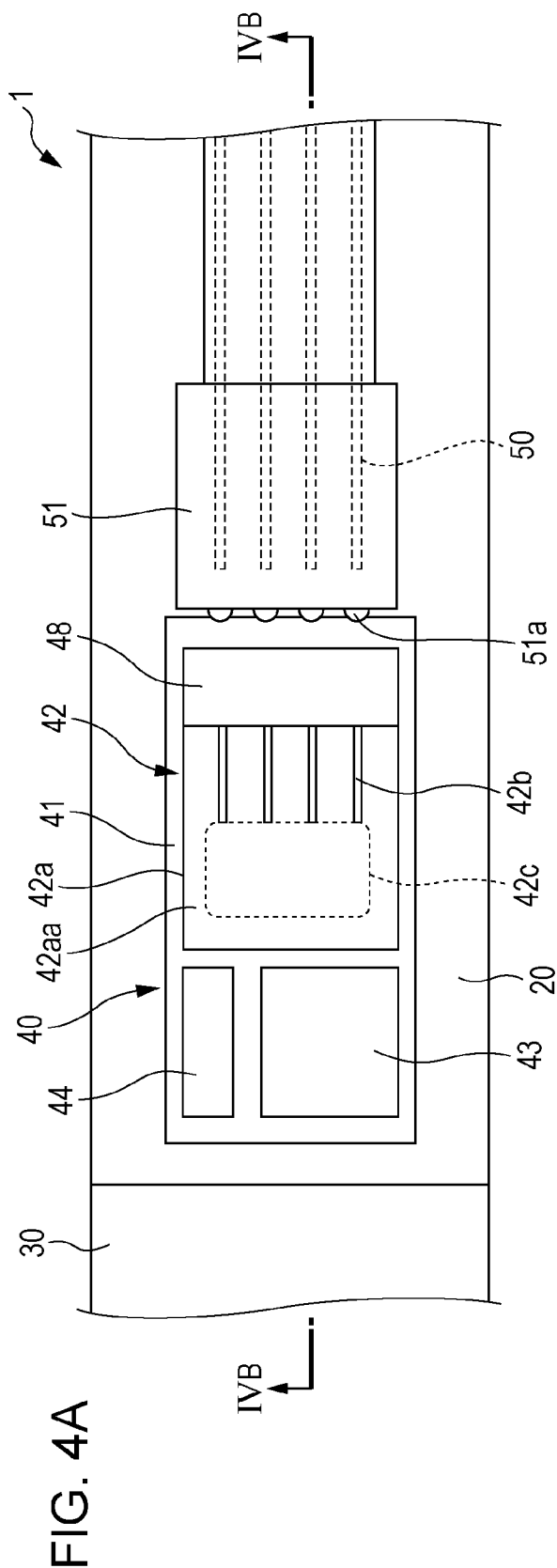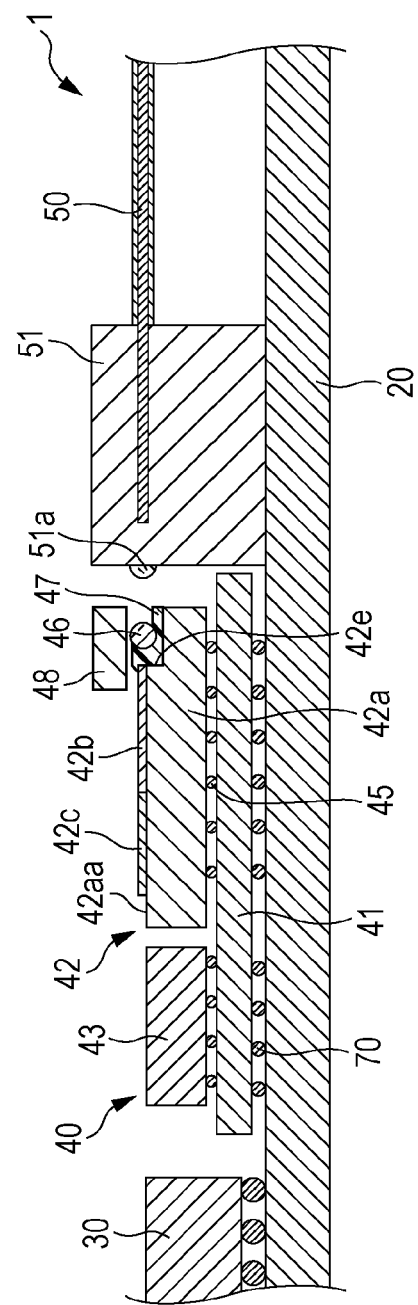

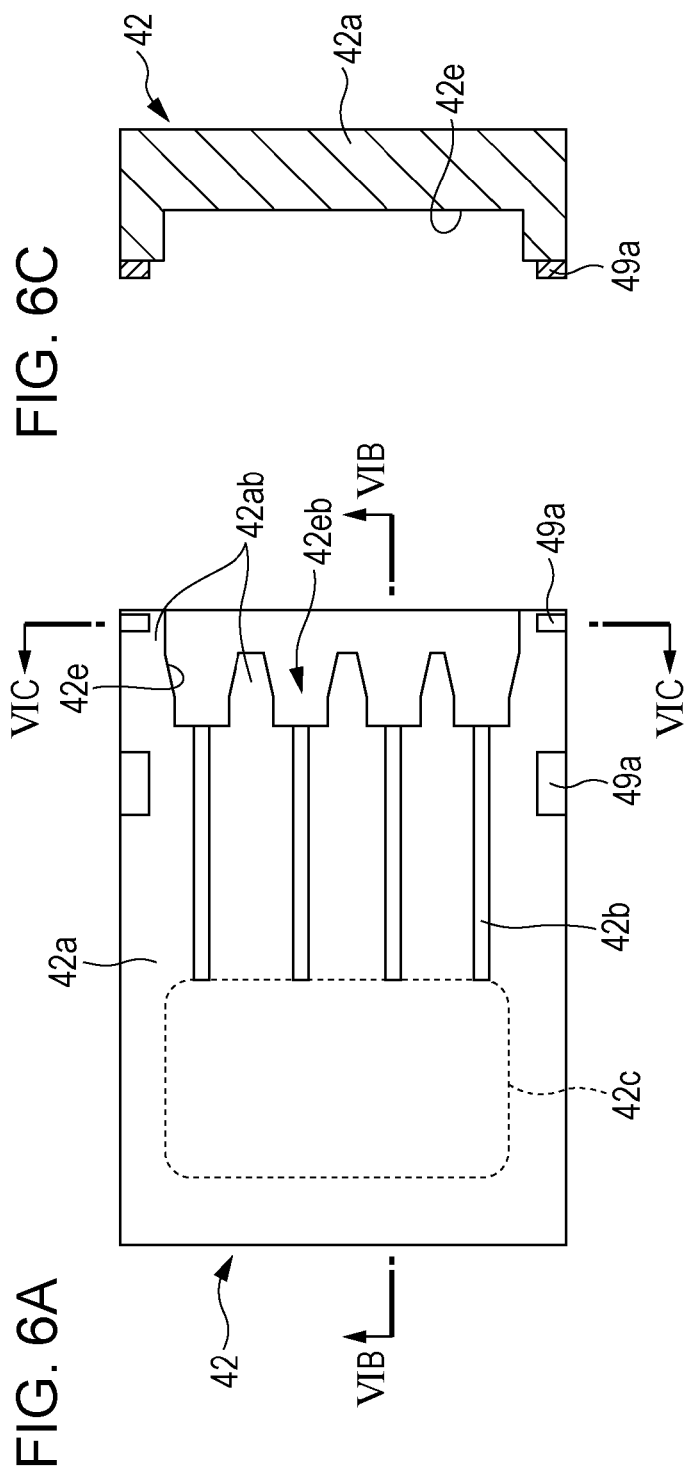
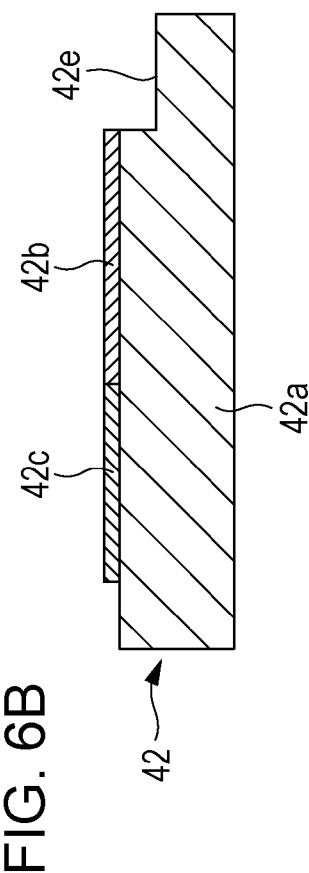

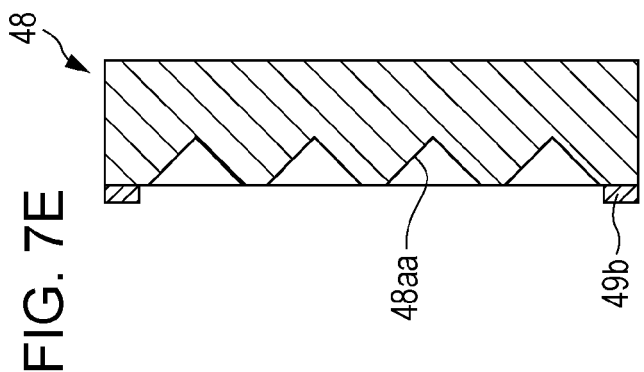
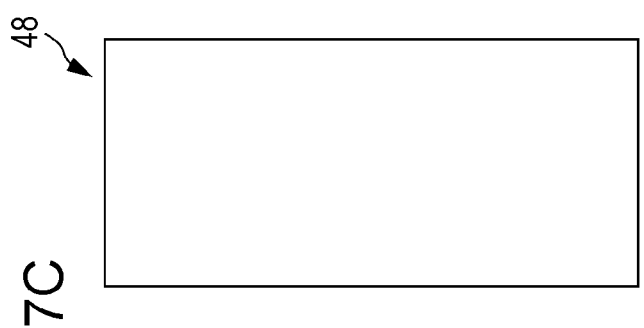
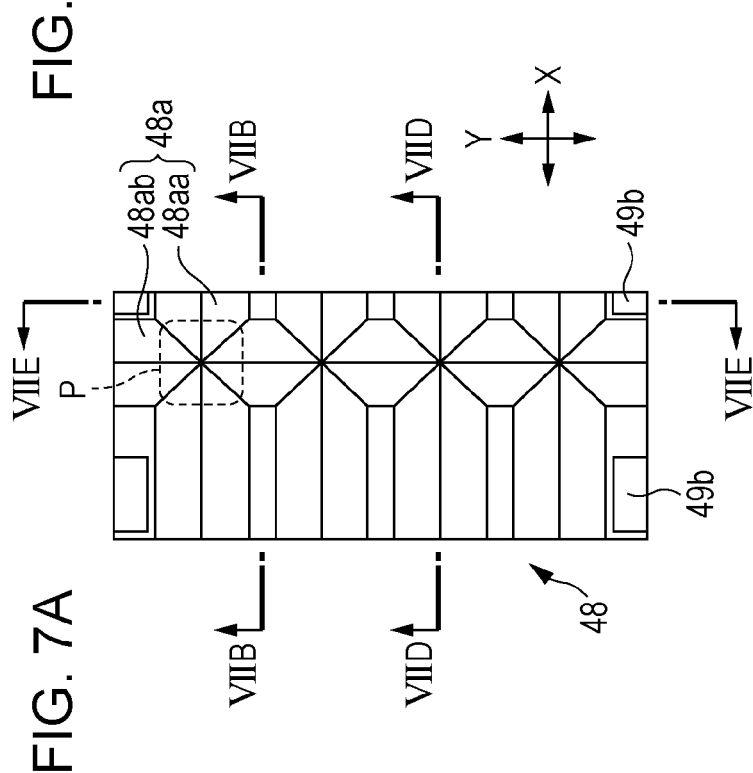
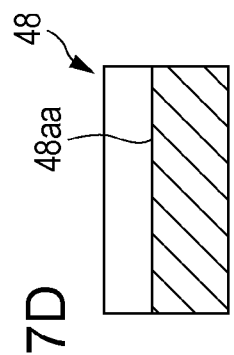
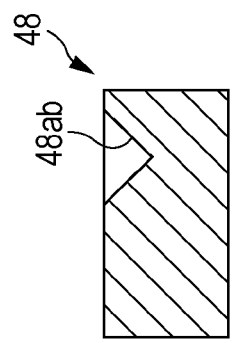

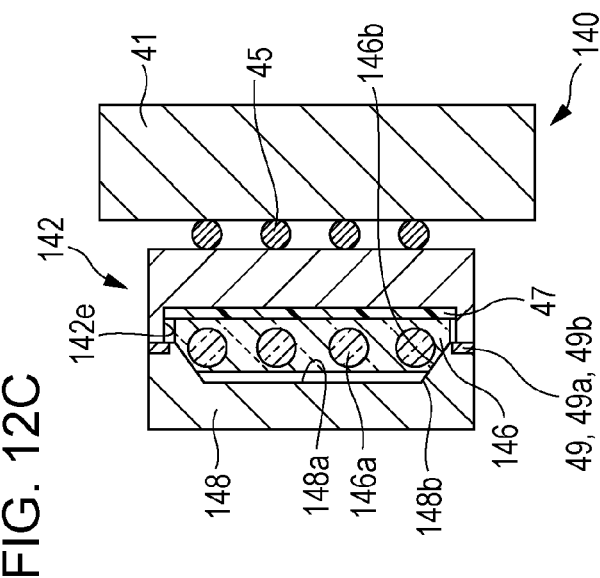
FIG. 12C
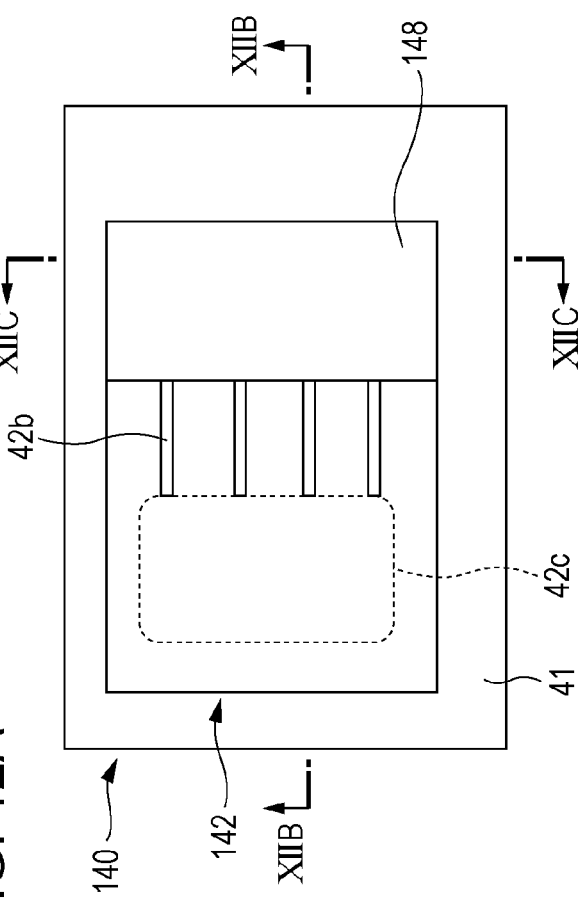
FIG. 12A
FIG. 12B
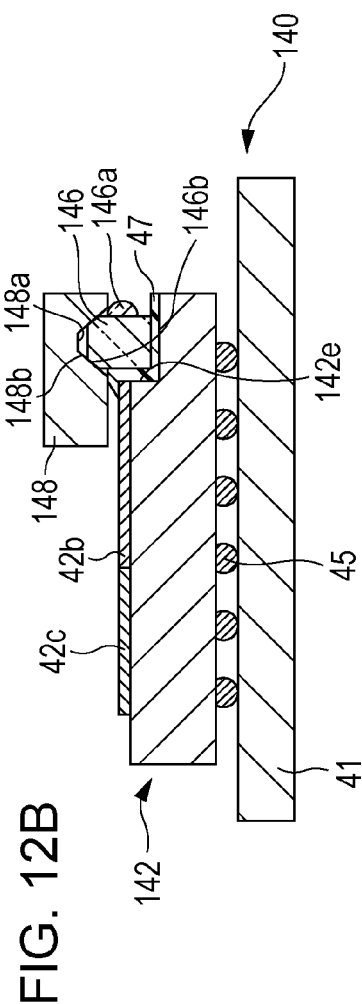

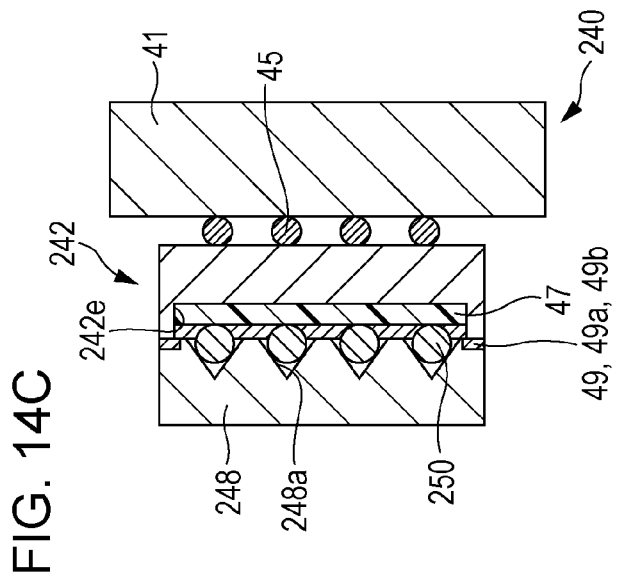
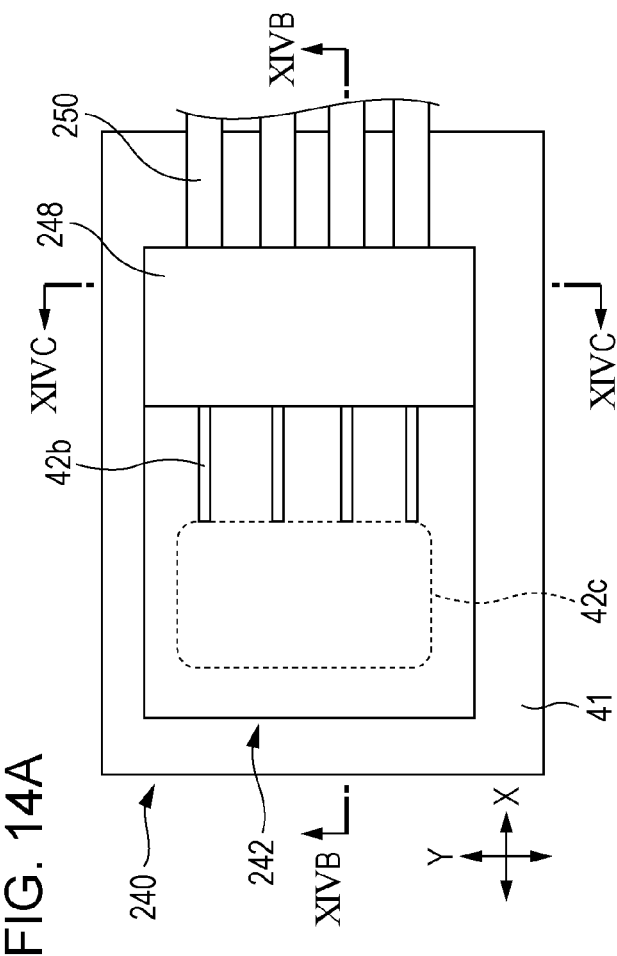
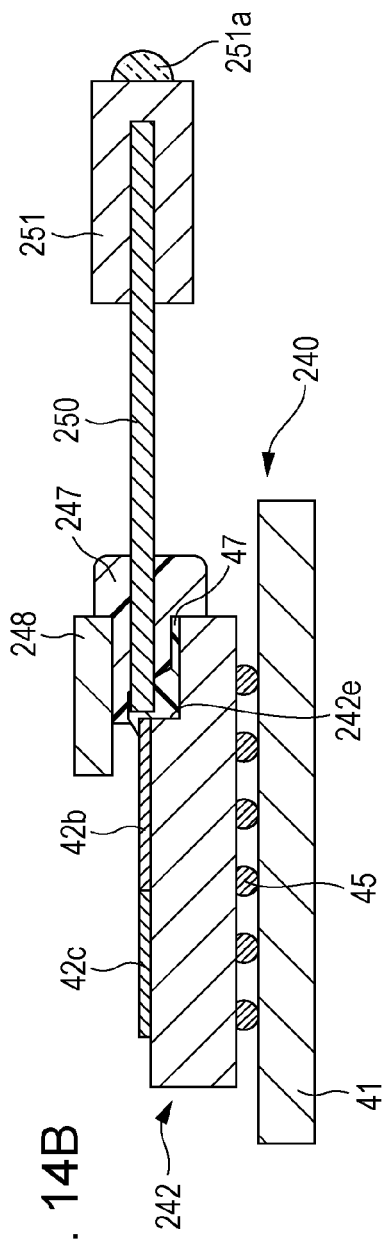
FIG. 14A
FIG. 14B
FIG. 14C

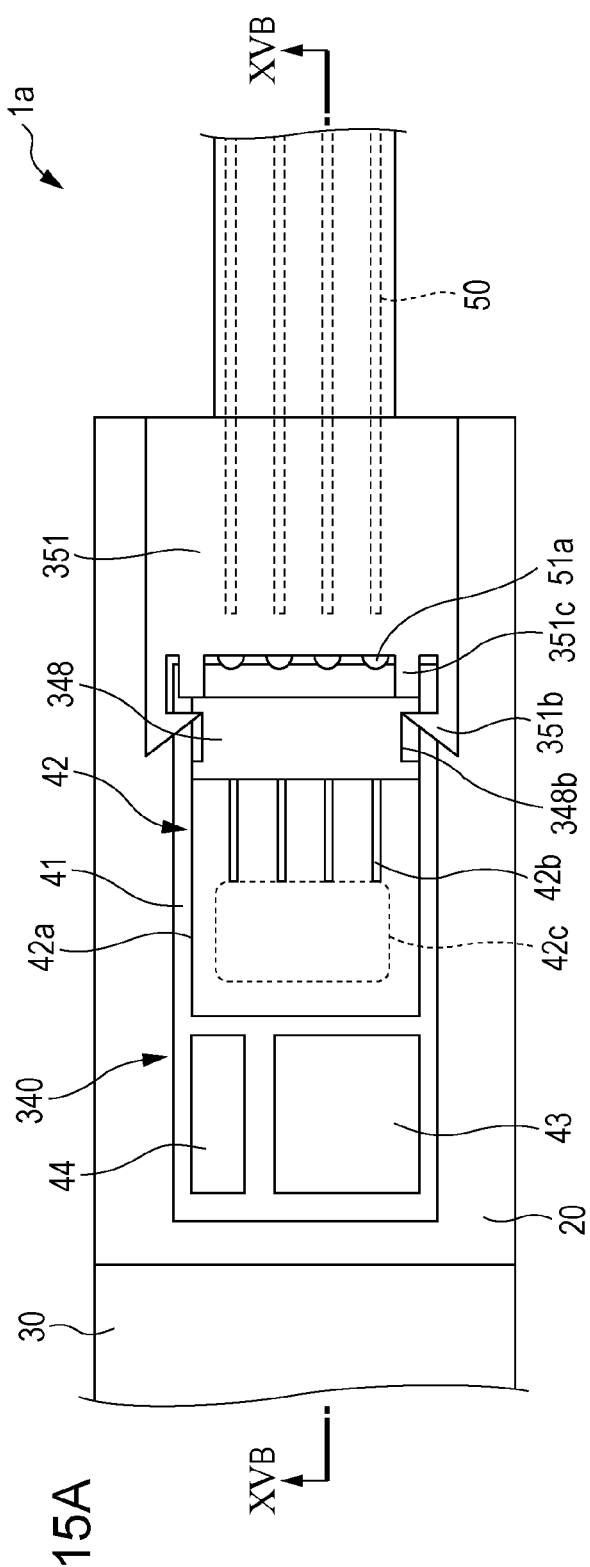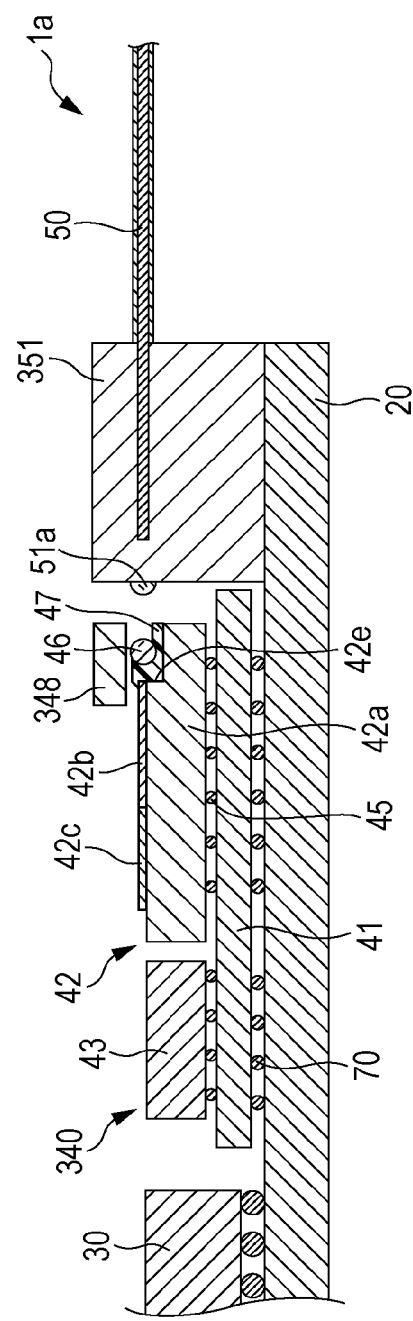

OPTICAL MODULE, MANUFACTURING METHOD OF OPTICAL MODULE, AND OPTICAL DEVICE

CROSS-REFERENCE TO RELATED APPLICATION

This application is based upon and claims the benefit of priority of the prior Japanese Patent Application No. 2014-126150, filed on Jun. 19, 2014, the entire contents of which are incorporated herein by reference.

FIELD

The embodiments discussed herein are related to an optical module, a manufacturing method of an optical module, and an optical device.

BACKGROUND

A technology has been known in which a groove is formed in a substrate on which an optical waveguide is disposed in an optical axis direction of the optical waveguide, an optical component is adhered to the groove by using a resin, and an optical module is obtained. For example, a method has been known in which a silicon substrate is used as the substrate, a groove is formed by an anisotropic etching, and an optical component such as a lens is adhered to the groove by using a resin.

Japanese Laid-Open Patent Publication No. 2006-10959 and Japanese Laid-Open Patent Publication No. 2005-234052 are examples of the related art.

In the optical module using the technology described above, the dimension of the groove formed in the substrate to which the optical component is adhered, the amount of resin used for adhering the optical component, thermal expansion of the resin due to heat at the time of using the optical module, and the like may be a cause to provoke a positional deviation of the optical component from a predetermined optical axis. In the optical module in which the positional deviation of the optical component occurs, sufficient optical coupling efficiency may not be obtained.

According to the disclosed technology, a positional deviation of an optical component is suppressed, and an optical module having sufficient optical coupling efficiency may be realized. In addition, an optical device including such an optical module may be realized.

SUMMARY

According to an aspect of the embodiments, an optical module includes: a first substrate configured to include an optical waveguide, and a first concave section provided over an end surface side of the optical waveguide; a resin configured to be disposed in the first concave section; an optical component configured to be disposed over the resin; and a second substrate configured to be jointed onto the first substrate, and to include a second concave section corresponding to the end surface in a surface facing the first concave section, the optical component being disposed between the resin and the second concave section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A and FIG. 4B are diagrams illustrating one example of an optical device according to a first embodiment;

FIG. 6A, FIG. 6B, and FIG. 6C are explanatory diagrams of one example of an optical waveguide chip according to the first embodiment;

FIG. 7A, FIG. 7B, FIG. 7C, FIG. 7D, and FIG. 7E are explanatory diagrams of one example of a guide substrate according to the first embodiment;

FIG. 12A, FIG. 12B, and FIG. 12C are explanatory diagrams of one example of an optical transceiver according to a second embodiment;

FIG. 14A, FIG. 14B, and FIG. 14C are explanatory diagrams of one example of an optical transceiver according to a third embodiment;

FIG. 15A and FIG. 15B are diagrams of one example of an optical device according to a fourth embodiment;

DESCRIPTION OF EMBODIMENTS

First, one example of an optical device including an optical module will be described.

For example, in the field of a server, a supercomputer, or the like, a high-speed data rate of interconnection has been desirable according to a speed-up of an operation speed of a system. Wiring (electrical wiring) which transmits an electrical signal may not be able to sufficiently satisfy the high-speed data rate from a viewpoint of a bandwidth, density, and electric power. As a technology replacing the interconnection of the electrical wiring, optical interconnection in which low power consumption between semiconductor elements such as large scale integration (LSI) and broad bandwidth transmission are realized by optical wiring has attracted attention. In the optical interconnection, an optical module which is referred to as an optical transceiver, and converts an electrical signal into an optical signal or the optical signal into the electrical signal is used.

Figure 1A:
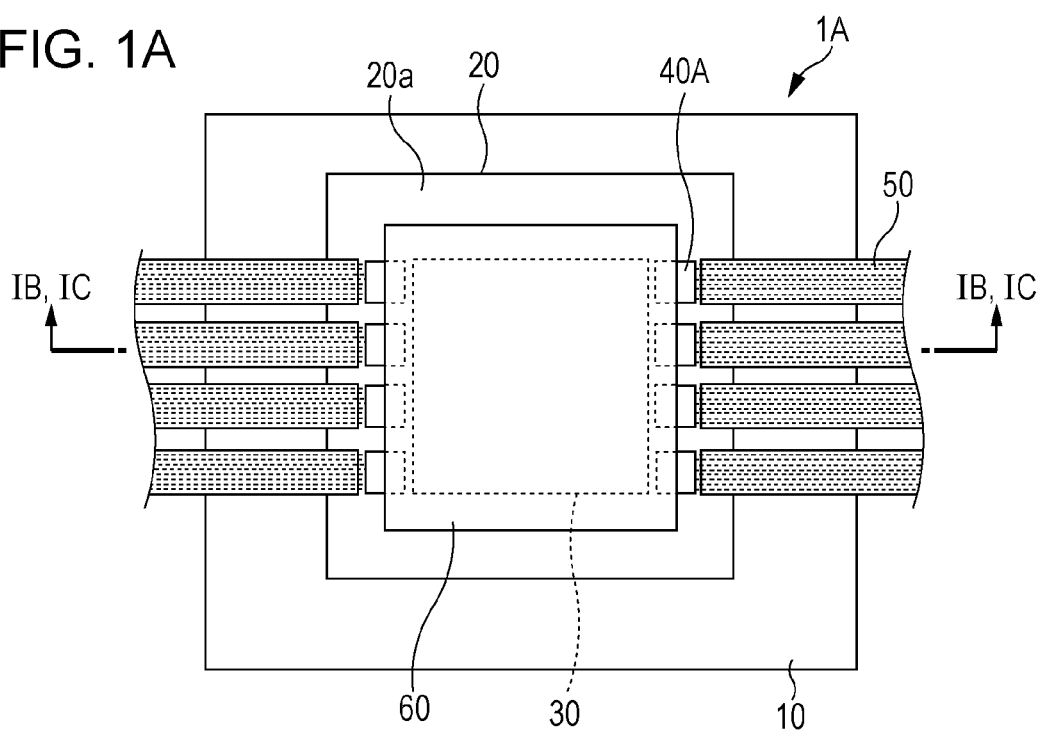
FIG. 1A, FIG. 1B, and FIG. 1C are diagrams illustrating a configuration example of an optical device.
Figure 1B:
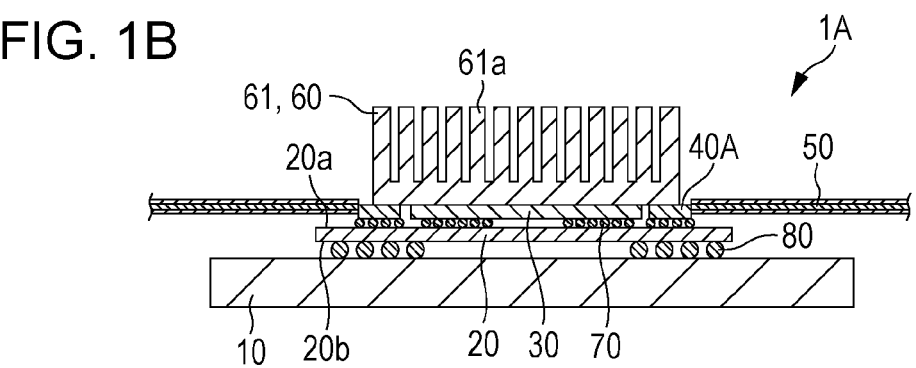
Figure 1C:
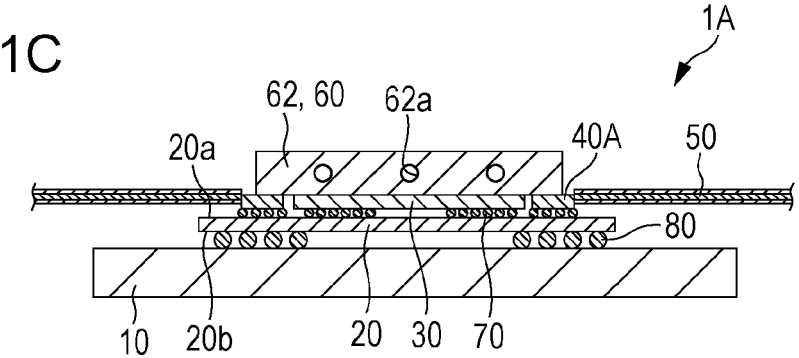

One example of a package for optical interconnection (an optical device) using an optical transceiver is illustrated in FIGS. 1A to 1C. FIGS. 1A to 1C are diagrams illustrating a configuration example of the optical device. Here, FIG. 1A is a schematic plan view of a main part of one example of the optical device, and FIG. 1B and FIG. 1C are examples of a schematic cross-sectional view along line IB, IC-IB, IC of FIG. 1A, respectively.

An optical device 1A illustrated in FIGS. 1A to 1C includes a board 10, a package substrate 20, a semiconductor device 30, an optical transceiver 40A, an optical fiber 50, and a heat dissipator 60.

The board 10, for example, is a circuit substrate such as a printed board in which a predetermined conductive pattern (wiring, via, or the like) is disposed in a front surface and an inner section thereof.

The package substrate 20, for example, is a circuit substrate (an interposer) such as a printed board in which a predetermined conductive pattern (wiring, via, or the like) is disposed in a front surface 20a, a back surface 20b, and an inner section thereof. The semiconductor device 30 and the optical transceiver 40A for optical interconnection are mounted over the package substrate 20.

The semiconductor device 30, for example, is a semiconductor package in which a semiconductor element (a semiconductor chip) such as LSI or a semiconductor chip such as LSI is mounted over a package substrate. Here, as one example, a configuration is illustrated in which one semiconductor device 30 is mounted over the package substrate 20.

A plurality of optical transceivers 40A, for example, is disposed around the semiconductor device 30 on the package substrate 20. The optical transceiver 40A, for example, may include an optical component such as an optical modulator, a photo detector, an optical waveguide, and a lens. The optical modulator, the photo detector, and the optical waveguide, for example, are able to be realized by using a silicon photonics technology. A configuration example of the optical transceiver 40A will be described later. According to Wikipedia published on the Internet, "Silicon photonics is the study and application of photonic systems which use silicon as an optical medium".

The semiconductor device 30 and the optical transceiver 40A, for example, are mounted over the package substrate 20 by using a bump 70 such as solder. Accordingly, the semiconductor device 30 and the optical transceiver 40A are electrically connected to the package substrate 20 through the bump 70, respectively. In addition, the semiconductor device 30 and the optical transceiver 40A are electrically connected to each other through the bump 70 and the package substrate 20.

The package substrate 20 on which the semiconductor device 30 and the optical transceiver 40A are mounted, for example, is mounted over the board 10 by using a bump 80 such as solder, and is electrically connected to the board 10.

The optical fiber 50 is a transmission path (optical wiring) of an optical signal, and a core thereof is formed in an optical waveguide. One end of the optical fiber 50 is optically connected to the optical transceiver 40A. The other end of the optical fiber 50 is optically connected to the other optical transceiver, and is connected to the other semiconductor device, or a memory or a storage which is electrically connected to the optical transceiver. The optical transceiver 40A converts an electrical signal which is received from the semiconductor device 30 into an optical signal, and transmits the optical signal to the other device through the optical fiber 50. Alternatively, the optical transceiver 40A converts the optical signal which is transmitted from the other device through the optical fiber 50 into the electrical signal, and transmits the electrical signal to the semiconductor device 30.

The heat dissipator 60 is disposed over the semiconductor device 30, or on the optical transceiver 40A. The heat dissipator 60, for example, is jointed onto the semiconductor device 30 or the like through a heat conductive material such as thermal interface material (TIM), thermal grease, and conductive paste which exhibits fixed heat conductivity, and is thermally connected to the semiconductor device 30 or the like. When the heat dissipator 60 is an air cooling type heat dissipator, as illustrated in FIG. 1B, the heat dissipator 60 may be a heat sink 61 in which a plurality of fins 61a (in the shape of a pin or a plate) is disposed. In addition, when the heat dissipator 60 is a liquid cooling type heat dissipator, as illustrated in FIG. 1C, the heat dissipator 60 may be a cooling plate 62 in which a pipe 62a circulating a cooling medium (cooling water) is disposed.

The optical transceiver 40A used in the optical device 1A as described above will be further described.

Figure 2A:
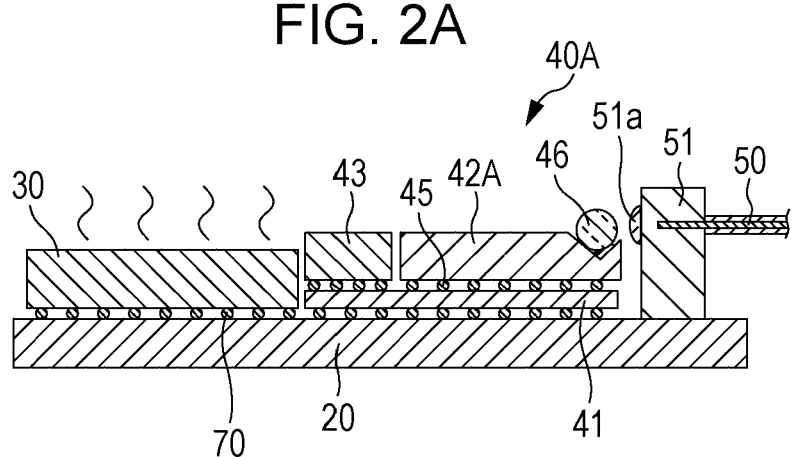
FIG. 2A, FIG. 2B, and FIG. 2C are explanatory diagrams of an optical transceiver.
Figure 2B:
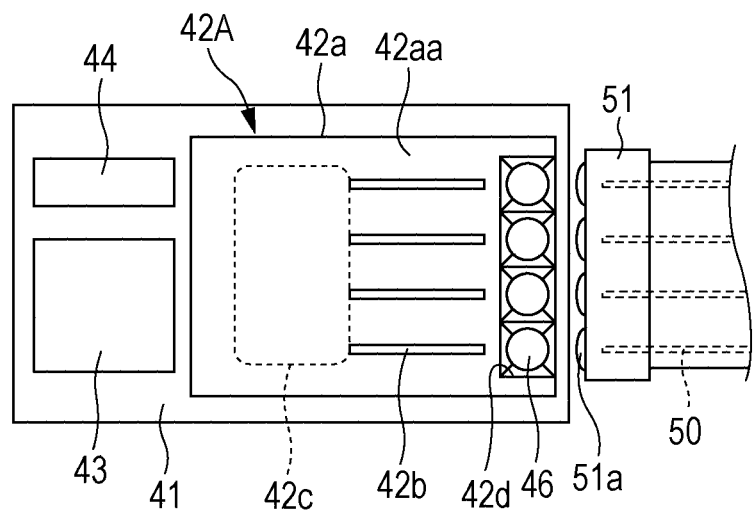
Figure 2C:
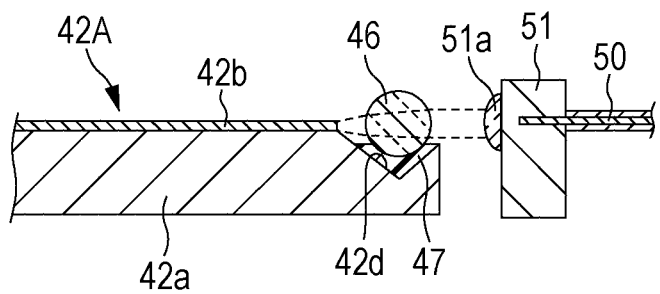

FIGS. 2A to 2C are explanatory diagrams of the optical transceiver. Here, FIG. 2A is a schematic cross-sectional view of a main part illustrating a mounting structure of one example of an optical transceiver, FIG. 2B is a schematic plan view of a main part of one example of the optical transceiver, and FIG. 2C is a schematic cross-sectional view of a main part of one example of the optical transceiver.

As illustrated in FIG. 2A, the optical transceiver 40A is mounted over the package substrate 20 along with the semiconductor device 30 by using the bump 70.

As illustrated in FIG. 2A and FIG. 2B, the optical transceiver 40A includes a sub package substrate 41, and an optical waveguide chip 42A, a driver chip 43, and a light source 44 which are mounted over the sub package substrate 41.

The sub package substrate 41, for example, is an interposer using alumina, silicon, or an organic material, and a predetermined conductive pattern (wiring, via, or the like) is formed in front and back surfaces and an inner section thereof. Electrical connection between the optical waveguide chip 42A and the driver chip 43, and the sub package substrate 41 using a bump 45 such as solder, and electrical connection between the sub package substrate 41 and the package substrate 20 using the bump 70 are performed by the conductive pattern.

The optical waveguide chip 42A is a substrate (an optical waveguide substrate) including an optical waveguide 42b which is disposed over a front surface 42aa of a substrate 42a (a bench) such as a silicon substrate, and herein, the number of optical waveguides 42b is four as one example. The optical waveguide chip 42A further includes an element region 42c including an optical modulator (a ring optical modulator, a Mach-Zehnder optical modulator, or the like) which modulating a phase and an intensity of light propagating in the optical waveguide 42b, and a photo detector detecting light propagating the optical waveguide 42b. The optical waveguide chip 42A is mounted over the sub package substrate 41 by using the bump 45, and is electrically connected to the sub package substrate 41.

The driver chip 43 includes a driver circuit controlling the optical waveguide chip 42A. The driver chip 43 is mounted over the sub package substrate 41 by using the bump 45, and is electrically connected to the sub package substrate 41.

Furthermore, the driver chip 43 may include an amplifier circuit in addition to the driver circuit.

The light source 44 is mounted over the sub package substrate 41, and is optically connected to the optical waveguide chip 42A.

A lens 46 is disposed in an optical axis direction of the optical waveguide 42b of the optical waveguide chip 42A in the optical transceiver 40A, and herein, four spherical lenses 46 corresponding to four optical waveguides 42b are disposed as one example. In the lens 46, for example, a collimating lens of which a focal point is an end surface of the optical waveguide 42b is used. The optical fiber 50 (an optical fiber ribbon cable or the like) is optically coupled to the optical waveguide 42b through the lens 46 (FIG. 2C), and thus light transmission between the optical device 1A including the optical transceiver 40A and the other device optically connected thereto through the optical fiber 50 is realized.

As illustrated in FIG. 2A to FIG. 2C, for example, a connector 51 including a lens 51a which is positioned in an optical axis direction of an end surface of the optical fiber 50 is disposed in a tip end section of the optical fiber 50. In the lens 51a, for example, a collimating lens is used. In the connector 51, the end surface of the optical fiber 50 is arranged in a focal point position of the lens 51a. The lens 51a is formed to have a curvature radius capable of connecting collimating light on the optical waveguide chip 42A side to the optical fiber 50 according to a refractive index and the number of openings of the optical fiber 50. The lens 51a of the connector 51 and the lens 46 of the optical transceiver 40A face each other, and thus the optical fiber 50, the lens 51a, the lens 46, and the optical waveguide 42b are optically coupled.

The optical waveguide 42b of the optical waveguide chip 42A, and the optical modulator and the photo detector of the element region 42c, for example, are formed by using a silicon photonics technology. As illustrated in FIG. 2A to FIG. 2C, a groove (a concave section) 42d is provided in the optical axis direction of the end surface of the optical waveguide 42b in the optical waveguide chip 42A, the lens 46 is adhered and fixed to the concave section 42d by using a resin 47. In this example, the concave section 42d in the shape of a quadrangular pyramid is disposed, and the lens 46 is adhered to the concave section 42d by using the resin 47. The concave section 42d, for example, is formed by performing an anisotropic etching with respect to a silicon substrate (the substrate 42a) of the optical waveguide chip 42A.

However, in order to perform broad bandwidth and long distance transmission, a single mode fiber may be used in addition to wavelength division multiplexing, but when the single mode fiber is used, higher positioning accuracy for optical coupling is desirable compared to a case where a multimode fiber is used. The size of the optical waveguide 42b of the optical waveguide chip 42A as described above, for example, is a submicron order, and thus even when a spot size converter or a grating coupler is used, an optical coupling loss may increase due to a positional deviation between the optical waveguide 42b and the optical fiber 50. In addition, in this case, when a method of positioning the optical fiber 50 while monitoring the intensity of the light is used, the man-hour may increase, and thus the manufacturing cost may increase.

In contrast, in a method of using the connector 51 including the lens 51a as described above, the lens 51a and the lens 46 face each other, the light is expanded to be parallel light and is connected. In this method, the light becomes expanded parallel light, and thus connection between the lens 51a and the lens 46 is comparatively weak with respect to an angle deviation, but is comparatively allowable with respect to positional deviation accuracy. Tolerance of the positional deviation between the optical waveguide chip 42A and the connector 51 is decreased to approximately a few dozen μm. For this reason, it is possible to more simply realize the optical transceiver 40A and the optical device 1A including the optical transceiver 40A by suppressing an increase in the manufacturing cost. Further, the connector 51 of the optical fiber 50 is arranged not to be in contact with the optical waveguide chip 42A, and thus it is possible to suppress damage in the optical waveguide chip 42A.

However, in order to position the optical waveguide 42b of the optical waveguide chip 42A, and the lens 46, high accuracy is desirable.

The lens 46 is arranged on the optical waveguide chip 42A, for example, by using a method in which anisotropic etching is performed with respect to the substrate 42a such as a silicon substrate, as described above, the concave section 42d in the shape of a quadrangular pyramid is provided, and the lens 46 is adhered to the concave section 42d by using the resin 47.

However, for example, the position of the lens 46 adhered to the concave section 42d may be shifted with respect to the optical axis of the end surface of the optical waveguide 42b according to the depth of the concave section 42d formed on the substrate 42a by the anisotropic etching, and a size relationship between a frontage of the concave section 42d and the lens 46. Further, a positional deviation of the lens 46 may occur due to volume contraction or the like which occurs at the time of curing the resin 47 according to the type or the amount of the resin 47 used for adhering the lens 46 to the concave section 42d.

In addition, as in the optical waveguide chip 42A described above, when a plurality of lenses 46 is disposed corresponding to a plurality of optical waveguides 42b, and a variation in a depth or the like between concave sections 42d in which each of the lenses 46 is disposed, a variation may occur in the position of each of the lenses 46 to be adhered. As a result thereof, a positional deviation between the optical waveguide 42b and the lens 46 may occur. Alternatively, it may be difficult to position the optical fiber 50 (the lens 51a in the optical axis direction) with respect to the lens 46 having a variation in the position and to optically couple the optical fiber 50 to the lens. When an optical fiber ribbon cable including a plurality of optical fibers 50 is used, it is more difficult to position the optical fiber 50 with respect to such a lens 46 having a variation in the position.

Figure 3A:
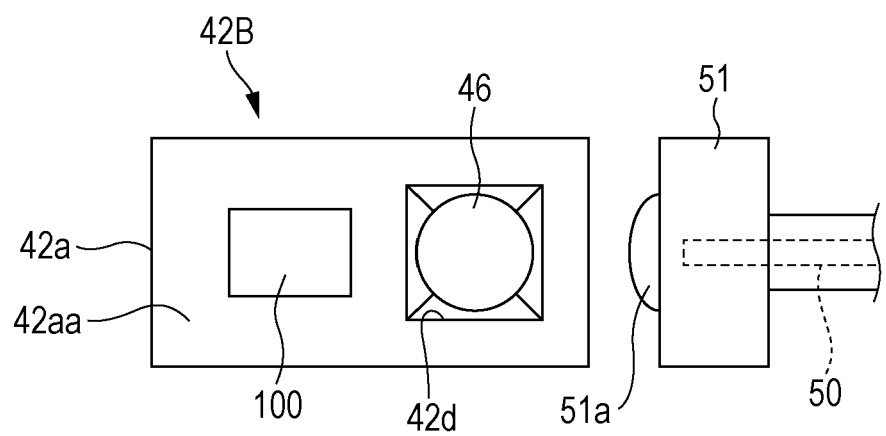
FIG. 3A and FIG. 3B are diagrams illustrating another example of an optical waveguide chip.
Figure 3B:
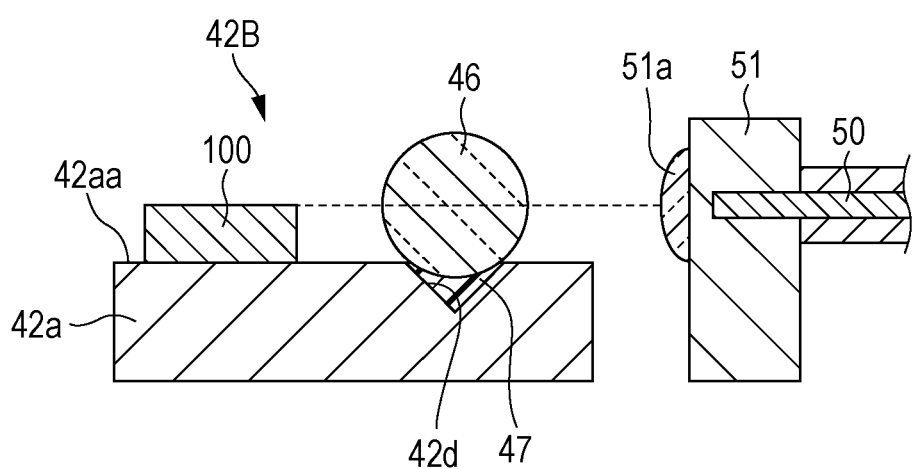

FIGS. 3A and 3B are diagrams illustrating another example of an optical waveguide chip. Here, FIG. 3A is a schematic plan view of a main part of another example of the optical waveguide chip, and FIG. 3B is a schematic cross-sectional view of a main part of another example of the optical waveguide chip.

An optical waveguide chip 42B illustrated in FIGS. 3A and 3B has a structure in which a semiconductor laser 100 is disposed over the front surface 42aa of the substrate 42a such as a silicon substrate, and the lens 46 is disposed in the optical axis direction thereof. The lens 46 is adhered to the concave section 42d of the substrate 42a by using the resin 47 which is formed by anisotropic etching or the like. The connector 51 including the lens 51a which is disposed over the tip end section of the optical fiber 50 is arranged facing the lens 46.

In such an optical waveguide chip 42B, the semiconductor laser 100 having a fixed thickness is disposed over the substrate 42a, and thus an optical axis position is a position of a fixed height from a front surface 42aa of the substrate 42a. For this reason, it is sufficient to form a shallower concave section 42d compared to a case where the optical waveguide 42b is disposed over the front surface 42aa of the substrate 42a as in the optical waveguide chip 42A.

Thus, in the optical waveguide chip 42A, a comparatively deep concave section 42d is formed, and thus a positional deviation of the lens 46 due to the dimension or a variation thereof of the concave section 42d as described above, and a positional deviation of the lens 46 according to the amount or the type of resin 47 may more easily occur.

Furthermore, when a silicon substrate is used as the substrate 42a, silicon is a transparent material with respect to infrared light, but refraction may occur at the surface. For this reason, in order to avoid an effect derived from the difference between the light angle of incidence and of refraction of, the concave section 42d is provided over an edge section of the optical waveguide chip 42A, and the end of the concave section 42d may be partially removed. However, in this case, the concave section 42d may be damaged according to an increase in the man-hour cost for forming the concave section 42d, and processing (partially removing the end of the concave section 42d).

In addition, in the optical device 1A, the optical transceiver 40A including the optical waveguide chip 42A reduces an electrical wiring length with respect to the semiconductor device 30, and thus may be arranged in the vicinity of the semiconductor device 30 on the package substrate 20. The semiconductor device 30 produces heat at the time of the operation thereof, and due to this produced heat, thermal expansion may occur in the resin 47 which is used in the optical waveguide chip 42A of the optical transceiver 40A. A positional deviation of the lens 46 may occur due to such thermal expansion of the resin 47.

In the optical device 1A, an optical axis deviation between the optical waveguide 42b and the lens 46 occurs due to a positional deviation of the lens 46 as described above, and sufficient optical coupling efficiency may not be obtained.

Therefore, hereinafter, an example of an optical device which is able to suppress a positional deviation between an optical waveguide and an optical component such as a lens disposed in an optical axis direction of an end surface thereof, and a manufacturing method thereof will be described in detail as an embodiment.

First, a first embodiment will be described.

FIGS. 4A and 4B are diagrams illustrating one example of an optical device according to the first embodiment. Here, FIG. 4A is a schematic plan view of a main part of one example of the optical device according to the first embodiment, and FIG. 4B is a schematic cross-sectional view along line IVB-IVB of FIG. 4A.

An optical device 1 illustrated in FIG. 4A and FIG. 4B includes the package substrate 20, and the semiconductor device 30 and an optical transceiver 40 which are mounted over the package substrate 20 by using the bump 70. The optical fiber 50 in which the connector 51 is disposed over the tip end section is further mounted over the package substrate 20. The package substrate 20 on which the semiconductor device 30, the optical transceiver 40, and the optical fiber 50 are mounted is mounted over the board 10 by using the bump 80, similar to the example of FIGS. 1A to 1C described above.

The optical transceiver 40 includes a sub package substrate 41, an optical waveguide chip 42 mounted over the sub package substrate 41 by using the bump 45, and the driver chip 43 including a driver circuit which controls the optical waveguide chip 42. Furthermore, the driver chip 43 may include an amplifier circuit. The light source 44 is further mounted over the sub package substrate 41, and is optically connected to the optical waveguide chip 42.

The optical waveguide chip 42 of the optical transceiver 40 is a substrate (an optical waveguide substrate) including the optical waveguide 42b (herein, four as one example) which is disposed over the front surface 42aa of the substrate 42a (the bench) such as a silicon substrate. The optical waveguide chip 42 further includes the element region 42c which includes an optical modulator modulating the phase of light propagating in the optical waveguide 42b, and a photo detector detecting the light propagating in the optical waveguide 42b. The optical waveguide 42b, and the optical modulator and the photo detector of the element region 42c, for example, are formed by using a silicon photonics technology.

A groove (a concave section) 42e which reaches a side end surface of the substrate 42a is disposed in the substrate 42a of the optical waveguide chip 42 on an end surface side of the optical waveguide 42b opposite to the element region 42c. The resin 47 is disposed in the concave section 42e, and a spherical lens 46 is adhered thereto. In the lens 46, for example, a collimating lens is used. A guide substrate 48 is disposed above the optical waveguide chip 42 facing the concave section 42e of the substrate 42a. The guide substrate 48 has a function of guiding the lens 46 over the resin 47 which is disposed in the concave section 42e of the optical waveguide chip 42 to a predetermined position, for example, a position at which the end surface of the optical waveguide 42b is on the optical axis, and the end surface is a focal point.

The optical waveguide chip 42 and the guide substrate 48 of this optical transceiver 40 will be further described.

Figure 5C:
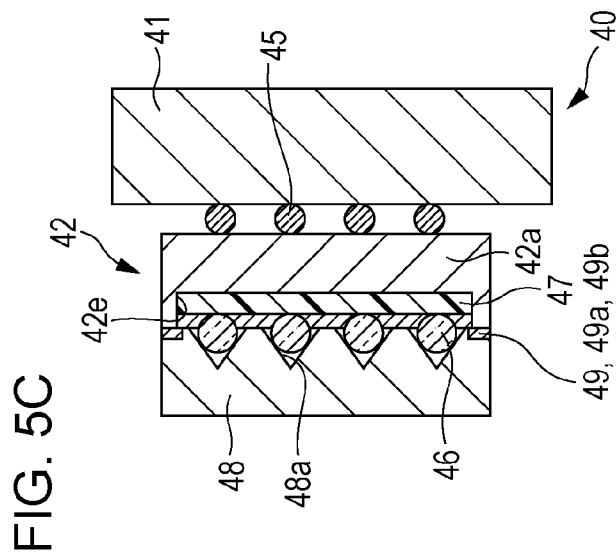
FIG. 5A, FIG. 5B, and FIG. 5C are explanatory diagrams of one example of an optical transceiver according to the first embodiment.
Figure 5A:
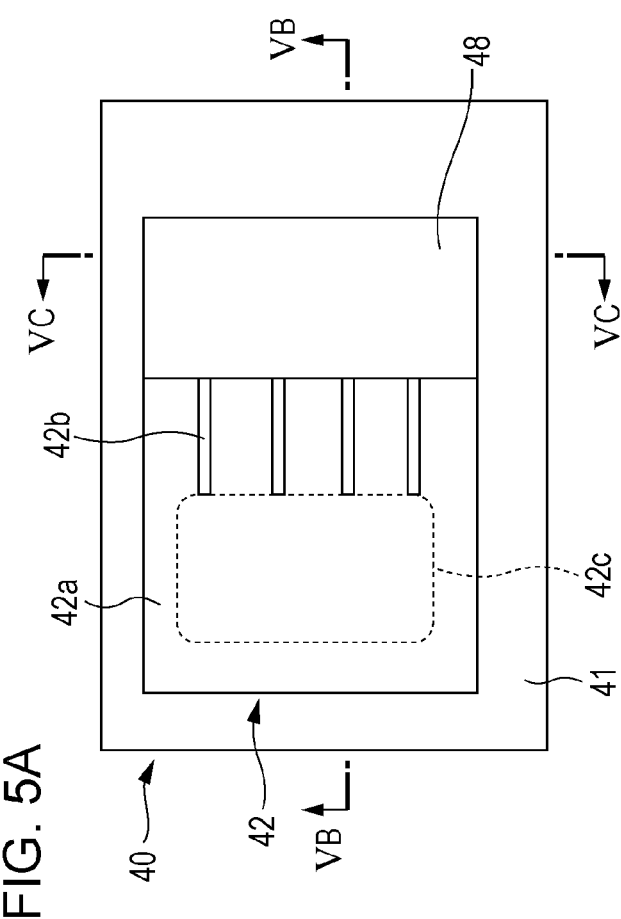
Figure 5B:
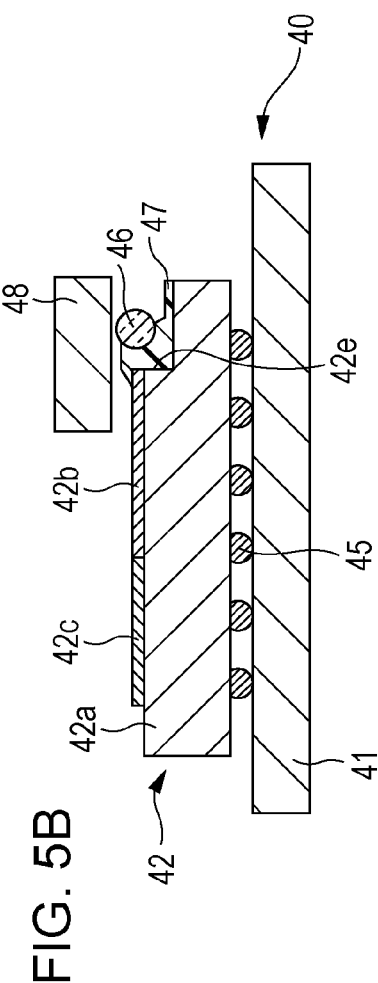

FIGS. 5A to 5C are explanatory diagrams of one example of an optical transceiver according to the first embodiment, FIGS. 6A to 6C are explanatory diagrams of one example of an optical waveguide chip according to the first embodiment, and FIGS. 7A to 7E are explanatory diagrams of one example of a guide substrate according to the first embodiment.

Here, FIG. 5A is a schematic plan view of a main part of one example of the optical transceiver according to the first embodiment, FIG. 5B is a schematic cross-sectional view along line VB-VB of FIG. 5A, and FIG. 5C is a schematic cross-sectional view along line VC-VC of FIG. 5A. In FIG. 5A to FIG. 5C, for the sake of convenience, the optical waveguide chip 42 on the sub package substrate 41, the resin 47 disposed over the concave portion 42e, and the lens 46 thereon, and the guide substrate 48 are illustrated, among components of the optical transceiver 40.

FIG. 6A is a schematic plan view of a main part of one example of the optical waveguide chip according to the first embodiment, FIG. 6B is a schematic cross-sectional view along line VIB-VIB of FIG. 6A, and FIG. 6C is a schematic cross-sectional view along line VIC-VIC of FIG. 6A.

FIG. 7A is a schematic plan view of a main part seen from a surface side facing the optical waveguide chip of one example of the guide substrate according to the first embodiment, FIG. 7B is a schematic cross-sectional view along line VIIB-VIIB of FIG. 7A, FIG. 7C is a schematic plan view of a main part seen from a surface side opposite to the surface facing the optical waveguide chip of one example of the guide substrate according to the first embodiment, FIG. 7D is a schematic cross-sectional view along line VIID-VIID of FIG. 7A, and FIG. 7E is a schematic cross-sectional view along line VIIE-VIIE of FIG. 7A.

As illustrated in FIG. 5A to FIG. 5C described above, the optical transceiver 40 includes the optical waveguide chip 42 which is mounted over the sub package substrate 41 by using the bump 45. The resin 47 such as a silicone-based resin is disposed in the concave section 42e of the optical waveguide chip 42, and the lens 46 such as a spherical collimating lens is disposed over the resin 47. A part of the resin 47 is disposed between the end surface of the optical waveguide 42b and the lens 46. The guide substrate 48 disposed above the concave section 42e includes the groove (the concave section) 48a which is provided corresponding to the end surface of the optical waveguide 42b, and the lens 46 is arranged in the position of the groove 48a. The guide substrate 48 is jointed to the optical waveguide chip 42 by using a metal layer 49. The lens 46 is pressed to the resin 47 side by the groove 48a of the guide substrate 48 which is jointed to the optical waveguide chip 42.

As one example, an adhesive agent having an refractive index of 1.55 is used as the resin 47, a spherical lens having a diameter of 200 μm is used as the lens 46, a distance from the end of the lens 46 to the end surface of the optical waveguide 42b is set to 400 μm, and a diameter of light beam emitted from the lens 46 is set to approximately 100 μm.

The optical waveguide chip 42 and the guide substrate 48 of the optical transceiver 40 will be described with reference to FIGS. 6A to 6C and FIGS. 7A to 7E, respectively.

As illustrated in FIG. 6A to FIG. 6C, the optical waveguide chip 42 includes the concave section 42e reaching the side end surface on one end surface (an end surface on a side opposite to the element region 42c) side of the optical waveguide 42b. The concave section 42e, for example, as illustrated in FIG. 6A, includes a region 42eb between a pair of side walls 42ab which are disposed over the substrate 42a to interpose an optical axis of the end surface of the optical waveguide 42b. As described later, the lens 46 is guided such that the side thereof (a direction orthogonal to the optical axis of the end surface of the optical waveguide 42b) is in contact with or is not in contact with the side wall 42ab, and is arranged in the region 42eb through the resin 47.

The width of the region 42eb in the concave section 42e (the width between the pair of side walls 42ab), for example, has a size greater than the size (the diameter) of the lens 46, and is a width to the extent of maintaining the pitch of the lens 46 arranged with respect to each optical waveguide 42b. The region 42eb of the concave section 42e, for example, may have a shape in which the width becomes broader as being separated from the end surface of the optical waveguide 42b in a plan view. The depth of the concave section 42e and the depth of the region 42eb in which each lens 46 is arranged may be a depth at which the lens 46 and the optical axis of the optical waveguide 42b are combined with each other at the time of pressing the lens 46 to the resin 47 side by the guide substrate 48, and may have a variation in the depth between the regions 42eb.

In a region of the optical waveguide chip 42 in which the guide substrate 48 is correspondingly arranged, a metal layer 49a (a part of the metal layer 49 illustrated in FIGS. 5A to 5C) is disposed. Here, as one example, as illustrated in FIG. 6A, a case where the metal layer 49a is disposed in four sections on the substrate 42a in a plan view will be described. The metal layer 49a, for example, may be a gold (Au) layer. In order to increase adhesion strength between the metal layer 49a and the substrate 42a, any one of a tin (Sn) layer, a titanium (Ti) layer, a nickel (Ni) layer, and a chromium (Cr) layer or a laminated body may be disposed over the substrate 42a, and an Au layer may be disposed over the outermost surface thereof. A film thickness of the metal layer 49a, for example, may be 0.1 μm.

The optical waveguide chip 42, for example, is formed as follows.

First, the optical modulator and the photo detector (the element region 42c), and the optical waveguide 42b are formed in a forming region of each optical waveguide chip 42 of a wafer (the substrate 42a before being diced) in a stage before dividing the wafer into each of the optical waveguide chips 42 by the dicing. Next, the metal layer 49a is formed in a predetermined section of the forming region of the optical waveguide chip 42. The element region 42c, the optical waveguide 42b, and the metal layer 49a may be formed by using a photolithography technology, an etching technology, a film forming technology, a liftoff technology, or the like.

After the metal layer 49a is formed, the concave section 42e is formed by using a photolithography technology and an etching technology. For example, the substrate 42a is deeply engraved up to approximately 65 μm by using a method of deep reactive ion etching (RIE) used in a BOSCH process. In dry etching, a variation in the depth of the concave section 42e (the region 42eb) may occur, but there is no problem in the deep reactive ion etching, and the concave section 42e to be formed may have comparatively rough accuracy satisfying the fixed dimension conditions described above.

After that, the wafer is diced, and is divided into each of the optical waveguide chips 42. The concave section 42e of each of the optical waveguide chips 42 is formed to be an opening pattern reaching the side end surface of the optical waveguide chip 42 as illustrated in FIG. 6A and FIG. 6B at the time of the dicing. This is because light emitted from the optical waveguide 42b or incident on the optical waveguide 42b, light passing through the lens 46, and light incident on the optical fiber 50 or emitted from the optical fiber 50 interfere with the side end surface of the optical waveguide chip 42, and thus refraction of the light does not occur.

For example, it is possible to form the optical waveguide chip 42 by the method described above.

In addition, the guide substrate 48, as illustrated in FIG. 7A, includes a metal layer 49b (a part of the metal layer 49 illustrated in FIGS. 5A to 5C) in a section corresponding to the metal layer 49a disposed in the optical waveguide chip 42. The metal layer 49b may be an Au layer, similar to the metal layer 49a as described above, and may have a structure in which an Au layer is disposed over the outermost surface of any one of a Sn layer, a Ti layer, a Ni layer, and a Cr layer or a laminated body. A film thickness of the metal layer 49b, for example, may be 0.1 μm.

As illustrated in FIG. 7A to FIG. 7E, the guide substrate 48 further includes the groove 48a on a surface side facing the optical waveguide chip 42. The groove 48a is provided corresponding to the end surface of the optical waveguide 42b of the optical waveguide chip 42.

The groove 48a includes a first groove 48aa extending in the optical axis direction of the end surface of the optical waveguide 42b, that is, in a direction X illustrated in FIGS. 7A to 7E, and a second groove 48ab extending in a direction Y orthogonal to the direction X. As illustrated in FIG. 7A and FIG. 7E, the first groove 48aa extending in the direction X is provided such that the shape of the cross-sectional surface along the direction Y (the shape of the cross-sectional surface) is a V shape. As illustrated in FIG. 7A and FIG. 7B, the second groove 48ab extending in the direction Y is provided such that the shape of the cross-sectional surface along the direction X (the shape of the cross-sectional surface) is a V shape.

Thus, an intersecting region P between the first groove 48aa extending in the direction X and the second groove 48ab extending in the direction Y is a region in which the lens 46 arranged in the concave section 42e is pressed to the resin 47 side at the time of jointing the guide substrate 48 to the optical waveguide chip 42. The first groove 48aa and the second groove 48ab are provided such that a focal point of the lens 46 is the position of the end surface of the optical waveguide 42b (corresponding to the end surface of the optical waveguide 42b) at the time of arranging the lens 46 in the center of the intersecting region P.

The guide substrate 48, for example, is formed as follows.

First, a substrate material (a base material) which forms the guide substrate 48 is prepared. In the base material of the guide substrate 48, for example, a silicon substrate, a quartz substrate, and a glass substrate such as Pyrex (registered trademark) may be used. A metal layer 49b is formed in a section corresponding to the metal layer 49a of the optical waveguide chip 42 of such a base material. The metal layer 49b may be formed by using a photolithography technology, an etching technology, a film forming technology, a liftoff technology, or the like.

After the metal layer 49b is formed, for example, the groove 48a is formed by using a cutting technology based on the position of the metal layer 49b. The groove 48a is formed by using a dicing saw having a V-shaped blade. In this example, as described above, four lenses 46 are mounted with respect to four optical waveguides 42b of the optical waveguide chip 42. In such a case, cutting is performed by using a dicing saw such that four first grooves 48aa corresponding to each of the optical waveguides 42b extend in the direction X. Further, the cutting is performed by using the dicing saw such that one second groove 48ab extends in the direction Y orthogonal to the four first grooves 48aa based on the lens 46 arranged in the first groove 48aa and the position of the end surface of the optical waveguide 42b (based on a focal point position of the lens 46).

As described above, the lens 46 is arranged in the intersecting region P between the first groove 48aa and the second groove 48ab at the time of jointing the guide substrate 48 to the optical waveguide chip 42, and the position of the lens 46 affects optical coupling efficiency with respect to the optical waveguide 42b. For this reason, when the guide substrate 48 is formed, it is preferable that the first groove 48aa and the second groove 48ab are formed by a cutting process having high positional accuracy.

For example, the guide substrate 48 may be formed by the method described above.

Subsequently, an assembling method will be described.

FIG. 8A to FIG. 11B are explanatory diagrams of an assembling step according to the first embodiment.

Figure 8A:
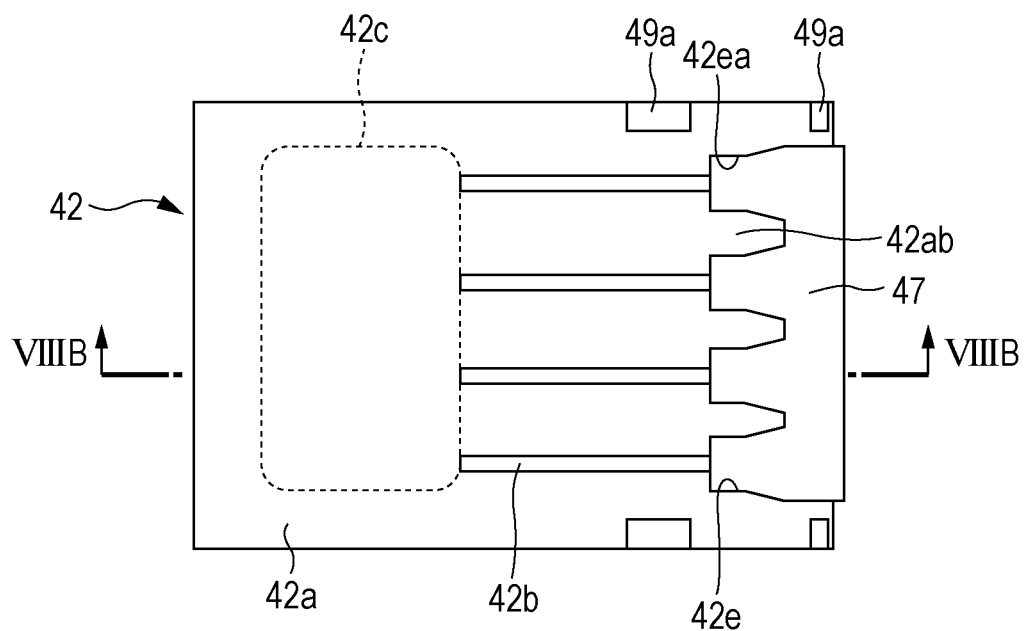
FIG. 8A and FIG. 8B are explanatory diagrams (a first) of an assembling step according to the first embodiment.
Figure 8B:
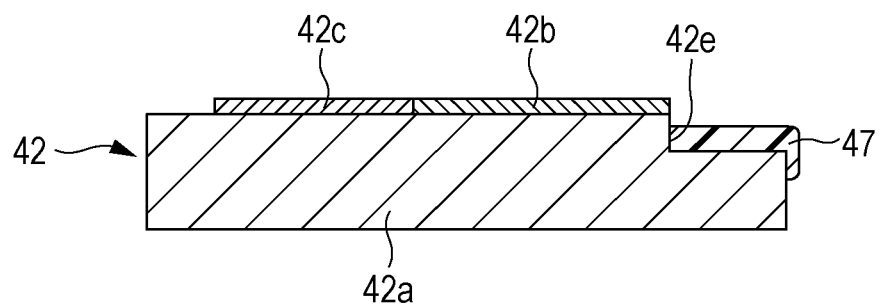
Figure 9A:
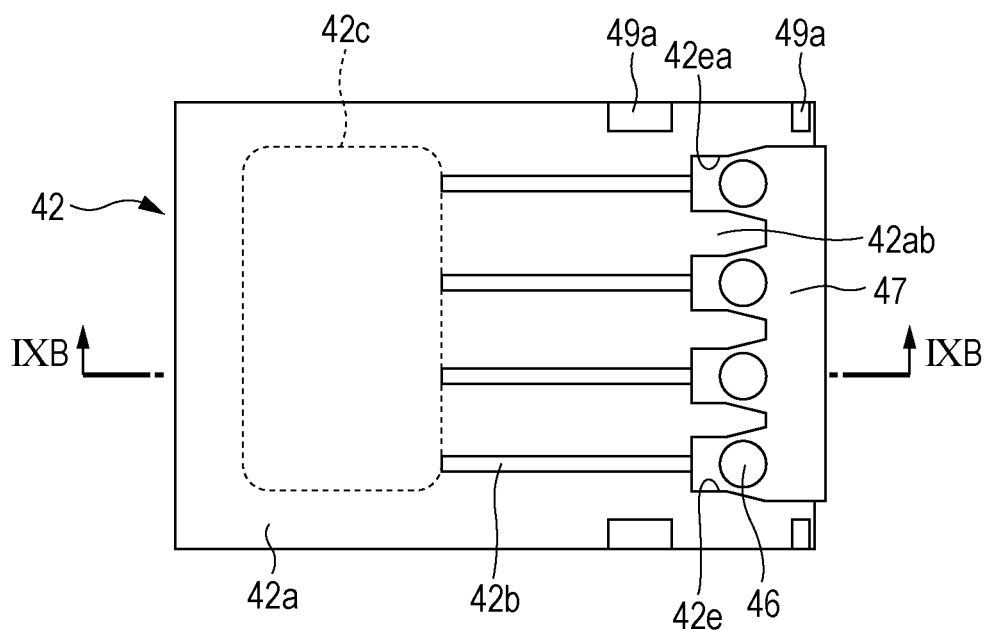
FIG. 9A and FIG. 9B are explanatory diagrams (a second) of the assembling step according to the first embodiment.
Figure 9B:
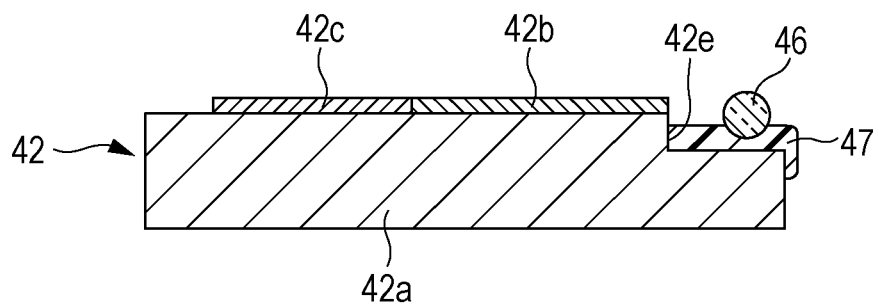
Figure 10A:
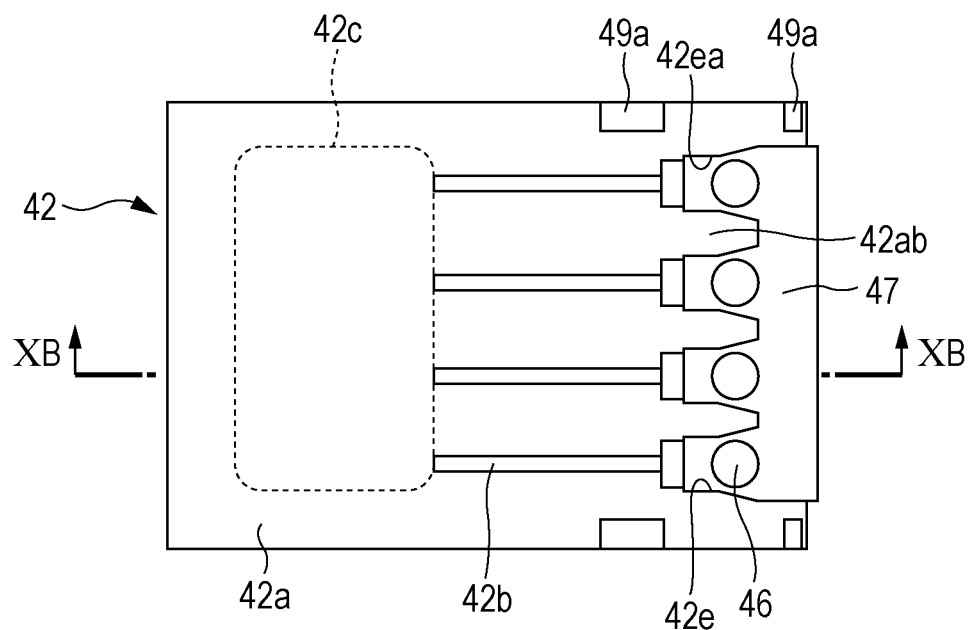
FIG. 10A and FIG. 10B are explanatory diagrams (a third) of the assembling step according to the first embodiment.
Figure 10B:
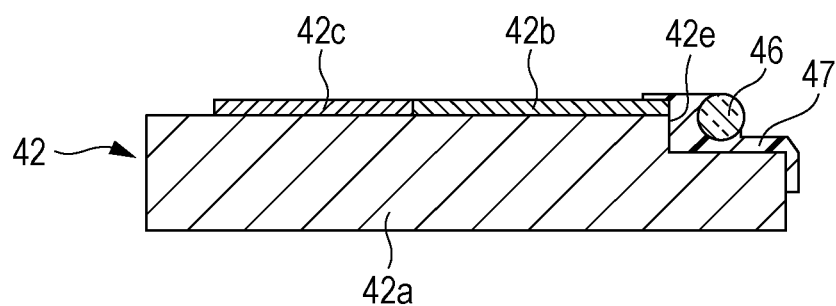
Figure 11A:
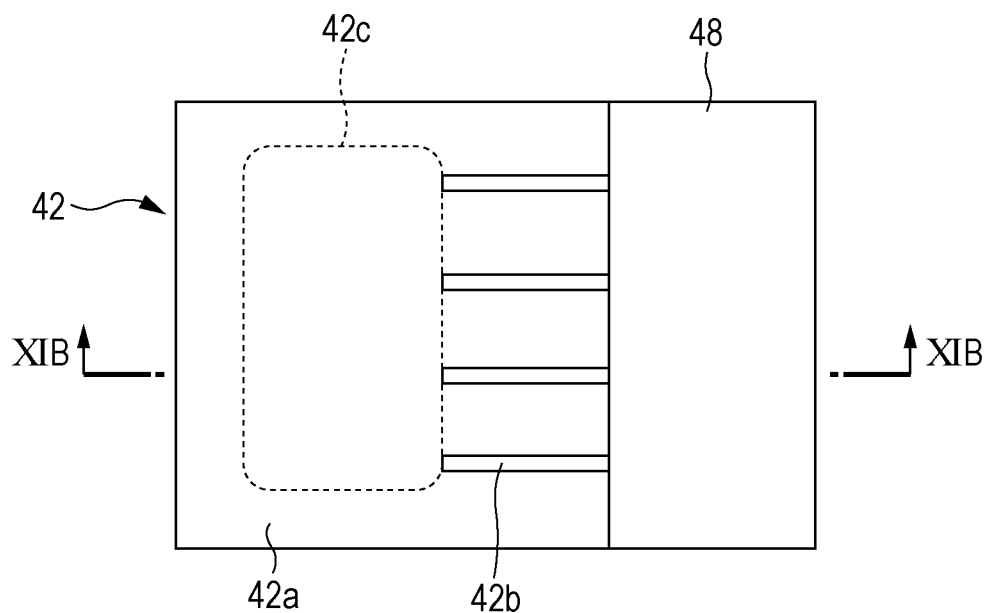
FIG. 11A and FIG. 11B are explanatory diagrams (a fourth) of the assembling step according to the first embodiment.
Figure 11B:
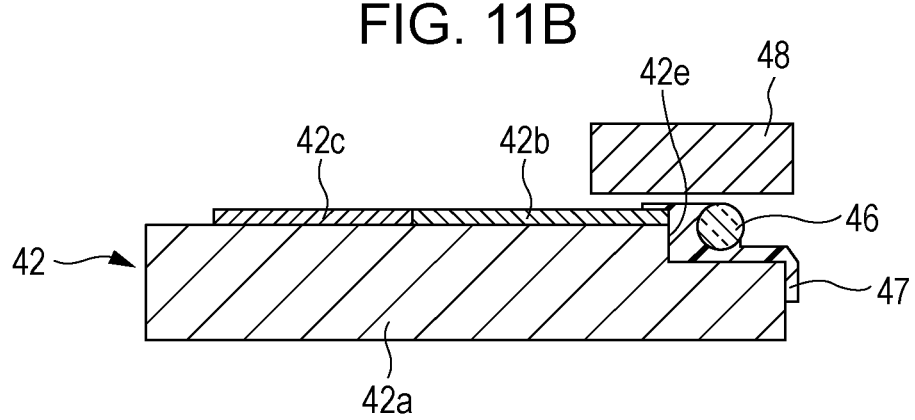

Here, FIG. 8A is a schematic plan view of a main part of a resin arranging step, and FIG. 8B is a schematic cross-sectional view along line VIIIB-VIIIB of FIG. 8A. FIG. 9A is a schematic plan view of a main part of a lens arranging step, and FIG. 9B is a schematic cross-sectional view along line IXB-IXB of FIG. 9A. FIG. 10A is a schematic cross-sectional view of a main part of a lens rearranging step, and FIG. 10B is a schematic cross-sectional view along line XB-XB of FIG. 10A. FIG. 11A is a schematic cross-sectional view of a main part of a guide substrate jointing step, and FIG. 11B is a schematic cross-sectional view along line XIB-XIB of FIG. 11A.

First, as illustrated in FIG. 8A and FIG. 8B, for example, the resin 47 is disposed in the concave section 42e of the optical waveguide chip 42 having a configuration as illustrated in FIGS. 6A to 6C described above. A fixed amount of the resin 47 is disposed in the concave section 42e by using a dispenser or the like. In the resin 47, a resin having transparency with respect to light passing through the lens 46 after being cured and fixed elasticity is used. In the resin 47, for example, a silicone-based resin may be used. In the resin 47, an epoxy-based resin, or an acrylic resin may be used in addition to the silicone-based resin.

After the resin 47 is disposed in the concave section 42e, as illustrated in FIG. 9A and FIG. 9B, the lens 46 is disposed over the resin 47. In the lens 46, a spherical collimating lens is used. The lens 46 may be disposed over the resin 47 with comparatively rough accuracy when the lens 46 is arranged in the region 42eb of the concave section 42e interposed between the side walls 42ab of the substrate 42a of the optical waveguide chip 42, that is, when one lens 46 is arranged in each of the optical waveguides 42b.

After the lens 46 is disposed over the resin 47, as illustrated in FIG. 10A and FIG. 10B, the lens 46 over the resin 47 is moved to the optical waveguide 42b side. For example, the lens 46 over the resin 47 is moved to the end surface side of the optical waveguide 42b by using a squeegee or a doctor blade. At this time, it is preferable that the lens 46 is arranged in a position in which the entire lens 46 or a part thereof is kept in the intersecting region P between the first groove 48aa and the second groove 48ab of the guide substrate 48 at the time of jointing the guide substrate 48 onto the optical waveguide chip 42 as described later.

When the lens 46 over the resin 47 is moved to the end surface side of the optical waveguide 42b, for example, the resin 47 is pressed to a narrowest section of the region 42eb of the concave section 42e or the resin 47 overflows from the concave section 42e, and thus the end surface of the optical waveguide 42b is covered with the resin 47. Accordingly, a part of the resin 47 may fill between the end surface of the optical waveguide 42b and the lens 46.

In a state where the lens 46 over the resin 47 is moved to the end surface side of the optical waveguide 42b, the resin 47 is cured by using a method according to the type of resin 47, for example, heating or ultraviolet light irradiation. Accordingly, the lens 46 is adhered to the concave section 42e of the optical waveguide chip 42 by the resin 47. The resin 47 has transparency and elasticity even after the adhesion.

After the lens 46 is adhered onto the resin 47, as illustrated in FIG. 11A and FIG. 11B, the guide substrate 48 is jointed to the optical waveguide chip 42. For example, the guide substrate 48 is mounted over the optical waveguide chip 42 by using a chip bonder, and the metal layer 49b of the guide substrate 48 (FIGS. 7A to 7E) and the metal layer 49a of the optical waveguide chip 42 (FIGS. 6A to 6C) are fixed to each other.

The guide substrate 48 and the optical waveguide chip 42, for example, may be jointed to each other by jointing the Au layers (Au—Au jointing) of the outermost surfaces of the metal layer 49b and the metal layer 49a to each other while heating. Furthermore, the guide substrate 48 and the optical waveguide chip 42 may be jointed to each other by fixing the metal layer 49b and the metal layer 49a to each other through a jointing material such as solder or conductive paste.

When the guide substrate 48 and the optical waveguide chip 42 are jointed to each other, the lens 46 is pressed to the resin 47 side by the guide substrate 48 at the time of allowing the guide substrate 48 to be close to the optical waveguide chip 42 side. In this case, the lens 46 is in contact with the groove 48a of the guide substrate 48, and the resin 47 is deformed by being pressed by the lens 46.

The lens 46 is guided by the first groove 48aa and the second groove 48ab while being pressed to the resin 47 side by the guide substrate 48, and is corrected to a final position (FIGS. 11A and 11B and FIGS. 5A to 5C) from an initial position (FIGS. 10A and 10B) over the resin 47. That is, the lens 46 enters through the wide frontage of the V-shaped first groove 48aa or the second groove 48ab in the vicinity of the intersecting region P according to the movement to the optical waveguide chip 42 side of the guide substrate 48, and the position is corrected along a inclined surface which is narrowed toward the inner section. According to this correction, the resin 47 having elasticity is deformed. Then, the lens 46 is finally corrected to be positioned in the center of the intersecting region P between the first groove 48aa and the second groove 48ab at the time of jointing the guide substrate 48 and the optical waveguide chip 42 to each other by the metal layers 49a and 49b (49). The lens 46 is pressed to the resin 47 side by the intersecting region P of the guide substrate 48, and is pressed to the intersecting region P side of the guide substrate 48 by an elastic force of the resin 47. Once the lens 46 is stored in the intersecting region P, the lens 46 is not easily moved from the intersecting region P.

The first groove 48aa and the second groove 48ab of the guide substrate 48 are provided in advance such that the end surface of the optical waveguide 42b is the focal point position of the lens 46 when the guide substrate 48 is jointed onto the optical waveguide chip 42, and the lens 46 is arranged in the intersecting region P. For this reason, according to the guide substrate 48 and the optical waveguide chip 42 described above, the guide substrate 48 is jointed onto the optical waveguide chip 42, and thus it is possible to arrange the lens 46 in a desired position with high accuracy while pressing the lens 46 to the resin 47. Further, according to the guide substrate 48 and the optical waveguide chip 42 described above, a plurality of lenses 46 may be collectively arranged in a desired position with high accuracy.

The optical waveguide chip 42 and the guide substrate 48 (the optical transceiver 40 including the optical waveguide chip 42 and the guide substrate 48) are arranged in a region comparatively close to the semiconductor device 30 which produces heat at the time of being operated, and thus thermal expansion may occur in the resin 47 which adheres the lens 46 due to the produced heat of the semiconductor device 30. According to the guide substrate 48 and the optical waveguide chip 42 described above, even when such thermal expansion occurs in the resin 47, stress is absorbed by elastic deformation of the resin 47, and thus it is possible to maintain the lens 46 over the resin 47 in the intersecting region P between the first groove 48aa and the second groove 48ab of the guide substrate 48. Accordingly, it is possible to effectively suppress a positional deviation in the lens 46 due to the thermal expansion of the resin 47.

In addition, as described above, the lens 46 over the resin 47 is moved to the end surface side of the optical waveguide 42b (FIGS. 10A and 10B), or the like, and the resin 47 is disposed between the end surface of the optical waveguide 42b and the lens 46, and thus it is possible to suppress an influence of reflected light due to the air.

The optical waveguide chip 42 to which the guide substrate 48 is jointed is mounted over the sub package substrate 41, or the guide substrate 48 is jointed to the optical waveguide chip 42 which is mounted over the sub package substrate 41. For example, the driver chip 43 and the light source 44 are further mounted over this sub package substrate 41, and thus the optical transceiver 40 (FIGS. 4A and 4B) is obtained. Then, the optical transceiver 40 and the semiconductor device 30 are mounted over the package substrate 20, and the connector 51 to which the optical fiber 50 is connected is further mounted thereon, and thus the optical device 1 (FIGS. 4A and 4B) is obtained.

In the resin 47 used for adhering the lens 46, a resin having predetermined heat resistance may be used. The resin having heat resistance is used in the resin 47, and thus even when solder is used in the bump 45 or the bump 70 and the resin is maintained at a solder reflow temperature (for example, approximately 260° C.) for a few minutes, transparency with respect to propagating light, and elasticity at the time of being deformed may be maintained.

According to the optical transceiver 40 of the first embodiment, a positional deviation in the lens 46 disposed over the end surface side of the optical waveguide 42b of the optical waveguide chip 42 is suppressed, and thus it is possible to effectively suppress an optical axis deviation between the optical waveguide 42b and the lens 46. Accordingly, it is possible to realize sufficient optical coupling efficiency between the optical waveguide 42b and the lens 46. In addition, it is possible to comparatively simply arrange the lens 46 with high accuracy, and thus it is possible to reduce the manufacturing cost of the optical transceiver 40.

Thus, in the optical transceiver 40, the lens 46 is arranged with respect to the optical waveguide 42b with high accuracy. For this reason, the optical fiber 50 which is external optical wiring may be connected by using the connector 51 including the lens 51a facing the lens 46 in which a positional deviation is comparatively allowable with respect to the optical waveguide 42b of the inner section optical wiring. Accordingly, it is possible to simply connect the optical fiber 50 by suppressing an increase in the positioning man-hour, and an increase in the manufacturing cost.

Furthermore, in the description of the assembling method described above, a method is exemplified in which the resin 47 is disposed in the concave section 42e of each of the optical waveguide chips 42 which is cut out by using a dispenser or the like (FIGS. 8A and 8B), the lens 46 is disposed over the resin 47 (FIGS. 9A and 9B), and the lens 46 is moved to the optical waveguide 42b side (FIGS. 10A and 10B).

In addition, the resin 47 may be collectively disposed in the concave section 42e of a plurality of optical waveguide chips 42 (for example, a group of the optical waveguide chips 42 which is arranged after being divided or the group of the optical waveguide chips 42 before being divided) by using a dispenser including a plurality of resin supply ports, or the like. Thus, after the resin 47 is disposed, the lens 46 is disposed over the resin 47 of each of the concave sections 42e of the group of the optical waveguide chips 42, and the lens 46 is collectively moved to the corresponding optical waveguide 42b side. By using such a method, it is possible to reduce the man-hour desirable for arranging the lens 46, and to reduce the manufacturing cost of the optical transceiver 40.

FIGS. 12A to 12C are explanatory diagrams of one example of an optical transceiver according to a second embodiment. Here, FIG. 12A is a schematic plan view of a main part of one example of the optical transceiver according to the second embodiment, FIG. 12B is a schematic cross-sectional view along line XIIB-XIIB of FIG. 12A, and FIG. 12C is a schematic cross-sectional view along line XIIC-XIIC of FIG. 12A.

An optical transceiver 140 illustrated in FIG. 12A to FIG. 12C includes a lens array 146 including a plurality of lenses 146a corresponding to each of the optical waveguides 42b of the optical waveguide chip 142, and a guide substrate 148 determining the position of the lens array 146. In the optical waveguide chip 142, a plane rectangular concave section 142e is provided in which the lens array 146 may be arranged.

In such a point, the optical transceiver 140 according to the second embodiment is different from the optical transceiver 40 according to the first embodiment described above. The other configuration may be identical to that of the optical transceiver 40 according to the first embodiment described above.

Furthermore, In FIG. 12A to FIG. 12C, for the sake of convenience, an optical waveguide chip 142 on the sub package substrate 41, the resin 47 disposed over a concave section 142e, the lens array 146 thereon, and a guide substrate 148 are illustrated, among components of the optical transceiver 140.

A lens 146a of the lens array 146, for example, is a collimating lens. The lens array 146 may be formed by mold injection of glass, or the like with high accuracy. In addition, the lens array 146 may be formed by using transparent plastic having heat resistance, or may be formed by processing a silicon substrate. The lens array 146 is chamfered with high accuracy such that the edge of the upper surface side at the time of forming the lens array 146 or after forming the lens array 146, that is the edge of the surface side facing the guide substrate 148 is an inclined surface 146b having a predetermined angle.

The guide substrate 148 includes a groove (a concave section) 148a which is provided corresponding to the end surface of the optical waveguide 42b of the optical waveguide chip 142. The groove 148a may be formed by using a cutting technology with high accuracy. The groove 148a is formed to include an inclined surface 148b having the same angle as that of the inclined surface 146b of the edge of the lens array 146. The lens array 146 is arranged in the groove 148a of the guide substrate 148 by bringing the inclined surface 146b in contact with the inclined surface 148b of the groove 148a. In the guide substrate 148, the groove 148a is disposed such that the end surface of the optical waveguide 42b is a focal point position of the lens 146a (corresponding to the end surface of the optical waveguide 42b) at the time of arranging the lens array 146 by bringing the inclined surface 148b in contact with the inclined surface 146b.

The optical waveguide chip 142 and the guide substrate 148 may be jointed to each other according to an example of the procedure as described in the first embodiment.

That is, first, the optical waveguide chip 142, the lens array 146, and the guide substrate 148 as described above are respectively prepared.

The resin 47 is disposed in the concave section 142e of the prepared optical waveguide chip 142 by using a dispenser or the like, and the lens array 146 is disposed over the resin 47. Then, the lens array 146 is moved to the end surface side of the optical waveguide 42b. Accordingly, for example, the lens array 146 is arranged in a position in which the entire lens array 146 is kept in the groove 148a of the guide substrate 148 at the time of jointing the guide substrate 148 onto the optical waveguide chip 142 as described later. In addition, for example, the resin 47 is pressed to the optical waveguide 42b and overflows from the concave section 142e, the end surface of the optical waveguide 42b is covered with the resin 47, and a part of the resin 47 fills between the end surface of the optical waveguide 42b and the lens array 146.

Thus, in a state where the lens array 146 over the resin 47 is moved to the end surface side of the optical waveguide 42b, the resin 47 is cured by using a method according to the type of resin 47, for example, heating or ultraviolet light irradiation, and thus the lens array 146 is adhered to the concave section 142e of the optical waveguide chip 142 by using the resin 47. The resin 47 has transparency and elasticity even after the adhesion.

After the lens array 146 is adhered to the resin 47, for example, the prepared guide substrate 148 is jointed to the optical waveguide chip 142 by using a chip bonder. At this time, the metal layer 49a disposed in the optical waveguide chip 142 and the metal layer 49b disposed in the guide substrate 148 are fixed to each other, and thus the optical waveguide chip 142 and the guide substrate 148 are jointed to each other by the metal layer 49.

When the optical waveguide chip 142 and the guide substrate 148 are jointed to each other, the lens array 146 is pressed to the resin 47 side by the guide substrate 148 at the time of allowing the guide substrate 148 to be close to the optical waveguide chip 142 side. The lens array 146 is guided by the inclined surface 148b while being pressed to the resin 47 side by the guide substrate 148, and thus the position is corrected. According to this correction, the resin 47 having elasticity is deformed. The lens array 146 is finally corrected to a position in which the inclined surface 146b is in surface-contact with the inclined surface 148b by jointing the guide substrate 148 and the optical waveguide chip 142 to each other by the metal layer 49. The lens array 146 is pressed to the resin 47 side by the groove 148a of the guide substrate 148, and is pressed to the groove 148a side of the guide substrate 148 by an elastic force of the resin 47.

The groove 148a is provided in advance such that the end surface of the optical waveguide 42b is the focal point position of the lens 146a when the guide substrate 148 is jointed onto the optical waveguide chip 142, and the lens array 146 is arranged in the groove 148a by bringing the inclined surface 148b in surface contact with the inclined surface 146b. For this reason, according to the guide substrate 148 and the optical waveguide chip 142 described above, the guide substrate 148 is jointed onto the optical waveguide chip 142, and thus it is possible to arrange the lens 146a in a desired position with high accuracy while pressing the lens array 146 to the resin 47 side.

The optical waveguide chip 142 to which the guide substrate 148 is jointed is mounted over the sub package substrate 41, or the guide substrate 148 is jointed to the optical waveguide chip 142 which is mounted over the sub package substrate 41. Further, according to the example of FIGS. 4A and 4B described above, the driver chip 43 and the light source 44 are mounted over the sub package substrate 41, and thus the optical transceiver 140 is obtained. Then, according to the example of FIGS. 4A and 4B, the optical transceiver 140 and the semiconductor device 30 are mounted over the package substrate 20, and the connector 51 to which the optical fiber 50 is connected is further mounted thereon, and thus the optical device is obtained. The resin 47 having predetermined heat resistance is used for adhering the lens array 146, and thus transparency with respect to propagating light and elasticity at the time of being deformed of the resin 47 may be maintained even through solder reflow.

In the optical transceiver 140, even when thermal expansion occurs in the resin 47 due to the produced heat of the semiconductor device 30 arranged in the vicinity of the optical transceiver 140, stress is absorbed by elastic deformation of the resin 47, and thus it is possible to suppress a positional deviation in the lens 146a. In addition, in the optical transceiver 140, the resin 47 is disposed between the end surface of the optical waveguide 42b and the lens array 146, and thus it is possible to suppress an influence of reflected light due to the air.

According to the optical transceiver 140 of the second embodiment, a positional deviation in the lens array 146 and the lens 146a thereof is suppressed, and an optical axis deviation between the optical waveguide 42b and the lens 146a is effectively suppressed, and thus it is possible to realize sufficient optical coupling efficiency. In addition, it is possible to comparatively simply arrange the lens array 146 with high accuracy, and thus it is possible to reduce the manufacturing cost of the optical transceiver 140. Further, it is possible to connect the optical fiber 50 by using the connector 51 in which a positional deviation is comparatively allowable with respect to the optical waveguide 42b, and thus it is possible to suppress an increase in the positioning man-hour, and an increase in the manufacturing cost.

Furthermore, here, a case where the inclined surface 146b is provided in the edge of the lens array 146 is exemplified, and a curved surface (an R surface) may be provided in the edge of the lens array 146.

Figure 13A:
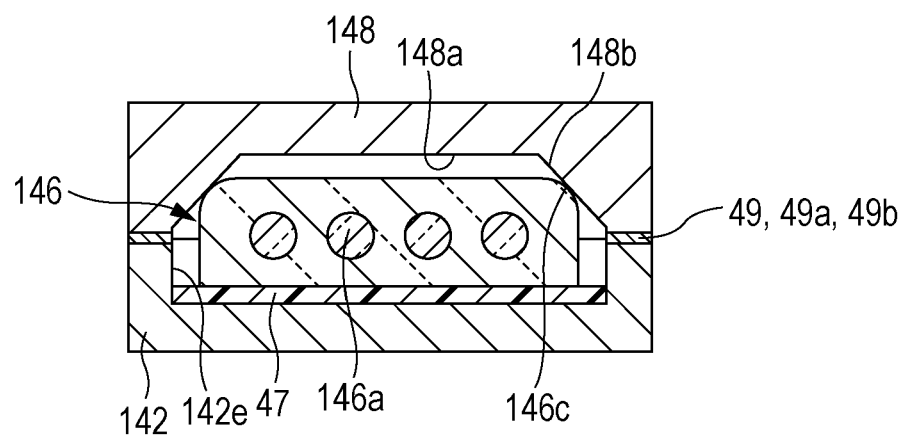
FIG. 13A and FIG. 13B are explanatory diagrams of another example of the optical transceiver according to the second embodiment.
Figure 13B:
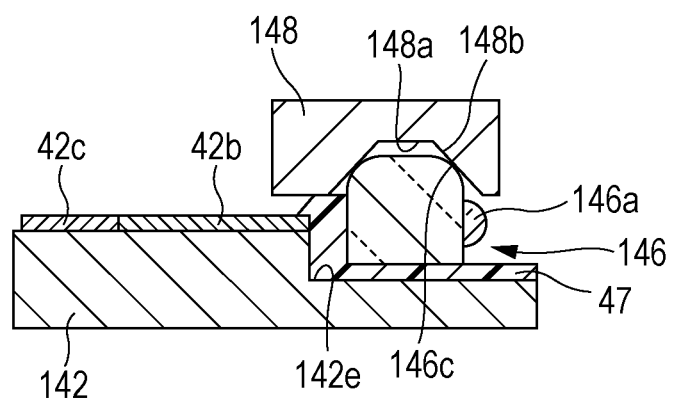

FIGS. 13A and 13B are explanatory diagrams of another example of the optical transceiver according to the second embodiment. Here, FIG. 13A and FIG. 13B are schematic cross-sectional views of a main part of another example of the optical transceiver according to the second embodiment.

As illustrated in FIG. 13A and FIG. 13B, the edge of the lens array 146 may be a curved surface 146c. Even when such a curved surface 146c is used, the lens array 146 is guided by the curved surface 146c at the time of pressing the lens array 146 disposed over the resin 47 of the concave section 142e of the optical waveguide chip 142 to the resin 47 side by the guide substrate 148, and thus the position of the lens array 146 is corrected. The lens array 146 is finally corrected to a position in which the curved surface 146c is in line-contact with the inclined surface 148b by jointing the guide substrate 148 and the optical waveguide chip 142 to each other by the metal layer 49.

Thus, even when the edge of the lens array 146 is the curved surface 146c, it is possible to arrange the lens 146a in a desired position with high accuracy while pressing the lens array 146 to the resin 47 side.

The edge of the lens array 146 is the inclined surface 146b or the curved surface 146c as described above, and thus it is possible to suppress damage in the edge of the lens array 146 at the time of being pressed by the guide substrate 148, and a positional deviation in the lens array 146 by the damage in the edge of the lens array 146, compared to a case where the edge has an angle.

FIGS. 14A to 14C are explanatory diagrams of one example of an optical transceiver according to a third embodiment. Here, FIG. 14A is a schematic plan view of a main part of one example of the optical transceiver according to the third embodiment, FIG. 14B is a schematic cross-sectional view along line XIVB-XIVB of FIG. 14A, and FIG. 14C is a schematic cross-sectional view along line XIVC-XIVC of FIG. 14A.

An optical transceiver 240 illustrated in FIG. 14A to FIG. 14C includes a plurality of optical fibers 250 corresponding to each of the optical waveguides 42b of an optical waveguide chip 242, and a guide substrate 248 determining the position of the optical fiber 250. In the optical waveguide chip 242, a plane rectangular concave section 242e is provided in which the optical fiber 250 may be arranged. In the optical fiber 250, an optical fiber (a pigtail or a pigtail fiber) from which a cover is peeled off is used, and the optical fiber 250 is adhered and fixed between a concave section 242e and the guide substrate 248 by using the resin 47 or another resin 247. In an end section of the optical fiber 250 on a side opposite to a side at which the optical fiber 250 is adhered by the resin 47 or the like, a connector 251 including a lens 251a is disposed.

In such a point, the optical transceiver 240 according to the third embodiment is different from the optical transceiver 40 according to the first embodiment. The other configuration may be identical to that of the optical transceiver 40 according to the first embodiment described above.

Furthermore, in FIG. 14A to FIG. 14C, for the sake of convenience, the optical waveguide chip 242 on the sub package substrate 41, the resin 47 and the resin 247 disposed over the concave section 242e, the optical fiber 250, and the guide substrate 248 are illustrated, among components of the optical transceiver 240.

The guide substrate 248 includes a groove (a concave section) 248a which is provided corresponding to the end surface of the optical waveguide 42b of the optical waveguide chip 242. The groove 248a is provided to extend in the optical axis direction of the end surface of each of the optical waveguides 42b, that is, in the direction X illustrated in FIGS. 14A and 14C, and is disposed such that the shape of the cross-sectional surface along the direction Y orthogonal to the direction X is a V shape. The groove 248a, for example, may be provided with high accuracy by performing cutting using a dicing saw which includes a V-shaped blade.

The optical waveguide chip 242 and the guide substrate 248 are able to be jointed to each other as follows.

That is, first, the optical waveguide chip 242, the optical fiber 250 including the connector 251, and the guide substrate 248 described above are respectively prepared.

The resin 47 is disposed in the concave section 242e of the prepared optical waveguide chip 242 by using a dispenser or the like, and the end section (an end section on the pigtail side) of the optical fiber 250 (in this example, four) from which the cover is peeled off is disposed over the resin 47. After that, the resin 47 is cured by a method such as ultraviolet light irradiation, and the optical fiber 250 is adhered to the concave section 242e of the optical waveguide chip 242 by the resin 47. The resin 47 has transparency and elasticity even after the adhesion.

After the optical fiber 250 is adhered onto the resin 47, for example, the guide substrate 248 is jointed by using a chip bonder. At this time, the metal layer 49a disposed in the optical waveguide chip 242 and the metal layer 49b disposed in the guide substrate 248 are fixed to each other, and thus the optical waveguide chip 242 and the guide substrate 248 are jointed to each other by the metal layer 49.

When the optical waveguide chip 242 and the guide substrate 248 are jointed to each other, the optical fiber 250 is guided by an inclined surface of the V-shaped groove 248a while being pressed to the resin 47 side by the guide substrate 248 at the time of allowing the guide substrate 248 to be close to the optical waveguide chip 242 side, and thus the position is corrected. According to this correction, the resin 47 having elasticity is deformed. The optical fiber 250 is finally corrected to a position of the groove 248a in which the guide substrate 248 and the optical waveguide chip 242 are jointed to each other by the metal layer 49. The optical fiber 250 is pressed to the resin 47 side by the groove 248a of the guide substrate 248, and is pressed to the groove 248a side of the guide substrate 248 by an elastic force of the resin 47. Thus, the guide substrate 248 is jointed onto the optical waveguide chip 242, and thus the optical fiber 250 is arranged in a desired position with high accuracy while being pressed to the resin 47 side.

The optical waveguide chip 242 to which the guide substrate 248 is jointed is mounted over the sub package substrate 41, or the guide substrate 248 is jointed to the optical waveguide chip 242 which is mounted over the sub package substrate 41. Further, according to the example of FIGS. 4A and 4B described above, the driver chip 43 and the light source 44 are mounted over the sub package substrate 41, and thus the optical transceiver 240 is obtained.

Then, according to the example of FIGS. 4A and 4B, the optical transceiver 240 and the semiconductor device 30 are mounted over the package substrate 20, and thus the optical device is obtained. However, when an optical fiber from which only the cover of the adhesive section with respect to the concave section 242e is peeled off is used as the optical fiber 250, it is preferable to adopt a process in which the mounting may be performed at a comparatively low temperature by using a connecting member used for mounting a land grid array (LGA) type device without using a solder bump. Similarly, when a ball grid array (BGA) type device is mounted by using a solder bump, it is desirable to thermally stabilize the cover of the optical fiber 250.

According to the optical transceiver 240 of the third embodiment, a positional deviation in the optical fiber 250 is suppressed, an optical axis deviation between the optical waveguide 42b and the optical fiber 250 is effectively suppressed, and thus it is possible to realize sufficient optical coupling efficiency. In addition, it is possible to comparatively simply arrange the optical fiber 250 with high accuracy, and it is possible to suppress an increase in the man-hour for manufacturing the optical transceiver 240 and the optical device including the optical transceiver 240, and an increase in the manufacturing cost.

Furthermore, in the above description, a method is exemplified in which the optical fiber 250 is adhered by the resin 47, and is pressed by the guide substrate 248. In addition, the optical fiber 250 may be arranged after the resin 47 is cured, the guide substrate 248 may be jointed to the optical waveguide chip 242 by pressing the optical fiber 250 by the groove 248a, and then the optical fiber 250 may be adhered by using another resin 247 (FIG. 14B) which is an adhesive agent.

In addition, in the above description, the lens facing type connector 251 is exemplified in which the lenses 251a are disposed in the optical fiber 250 to face each other. The type of connector disposed in the optical fiber 250 is not limited to this example, but various types of connector, for example, a connector connecting by butt joint such as a mechanically transferable (MT) connector may be adopted.

In addition, in the above description, the pigtail type optical fiber 250 is exemplified. In addition, similar to the above description, in a fiber-like lens referred to as a gradient index (GRIN) lens which is one of optical components collimating light, it is possible to dispose the optical fiber 250 between the optical waveguide chip 242 and the guide substrate 248.

FIGS. 15A and 15B are diagrams illustrating one example of an optical device according to a fourth embodiment. Here, FIG. 15A is a schematic plan view of a main part of one example of the optical device according to the fourth embodiment, and FIG. 15B is a schematic cross-sectional view along line XVB-XVB of FIG. 15A.

An optical device 1a illustrated in FIG. 15A and FIG. 15B includes the semiconductor device 30 and an optical transceiver 340 which are mounted over the package substrate 20 by using the bump 70, and the optical fiber 50 in which a connector 351 including the lens 51a is disposed. A guide substrate 348 which includes the groove 48a in a surface facing the concave section 42e and a concave section 348b in a side surface is disposed above the optical waveguide chip 42 of the optical transceiver 340. In the connector 351 of the tip end section of the optical fiber 50, an engaging section (a claw section) 351b engaged to the concave section 348b of the guide substrate 348 and a protruding section 351c in contact with the guide substrate 348 are disposed.

In such a point, an optical device is according to the fourth embodiment is different from the optical device 1 according to the first embodiment described above. The other configuration may be identical to that of the optical device 1 according to the first embodiment described above. Similar to the example of FIGS. 1A to 1C described above, the package substrate 20 on which the semiconductor device 30, the optical transceiver 340, and the optical fiber 50 are mounted is mounted over the board 10 by using the bump 80.

In the optical device 1a, the connector 351 of the tip end section of the optical fiber 50 is arranged by engaging the engaging section 351b to the concave section 348b of the guide substrate 348, and thus the lens 51a of the connector 351 side and the lens 46 of the optical waveguide chip 42 side are optically coupled. Further, when such a connector 351 is arranged, the protruding section 351c is in contact with the guide substrate 348, and thus it is possible to reduce an angle deviation between the lens 51a and the lens 46, and it is possible to increase optical coupling efficiency.

According to the optical transceiver 340 of the fourth embodiment, it is possible to suppress a positional deviation in the lens 46 as described in the optical transceiver 40 described above, and it is possible to simply arrange the lens 51a facing the lens 46 in a suitable position. A component for retaining a connector on the package substrate 20 may not be provided separately. Further, even when BGA is mounted, application of heat resistance to the fiber cover may be omitted. According to the configuration described above, it is possible to suppress an increase in the man-hour for manufacturing the optical transceiver 340 and the optical device is including the optical transceiver 340, and an increase in the manufacturing cost.

Furthermore, the connector 351 as described in the fourth embodiment may be similarly applied to the optical device according to the second embodiment described above.

Figure 16:
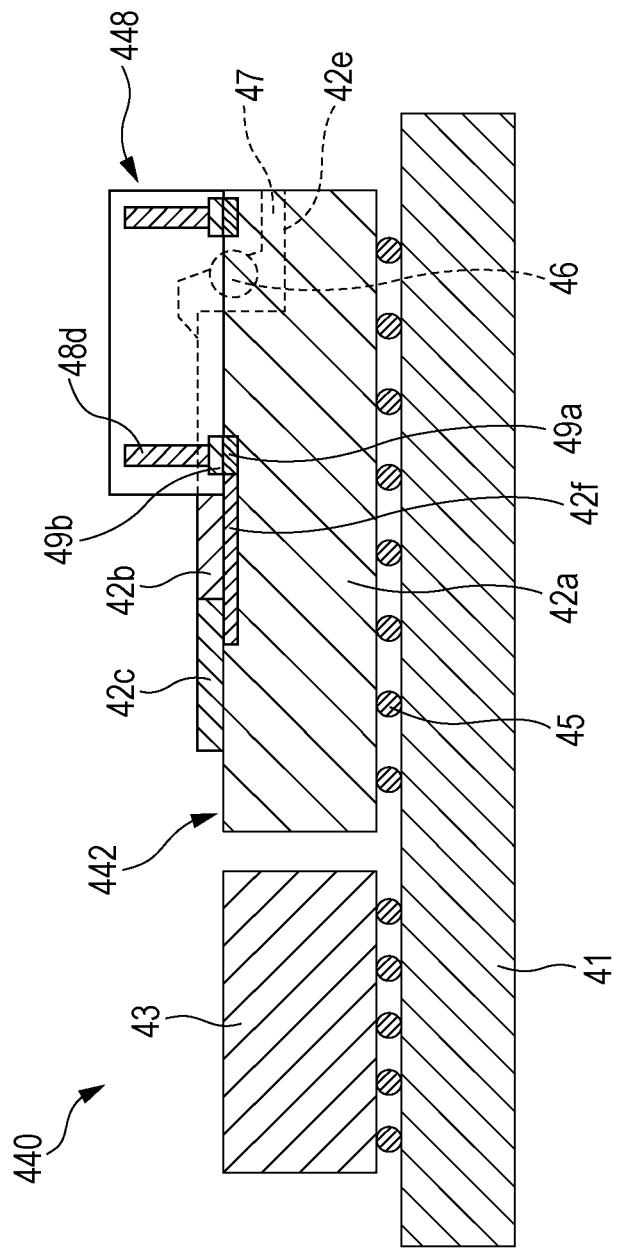
FIG. 16 is an explanatory diagram of one example of an optical transceiver according to a fifth embodiment.

FIG. 16 is an explanatory diagram of one example of an optical transceiver according to a fifth embodiment. Here, FIG. 16 is a schematic cross-sectional view of a main part of one example of the optical transceiver according to the fifth embodiment.

An optical transceiver 440 illustrated in FIG. 16 includes an optical waveguide chip 442 including a conductive pattern 42f which is electrically connected to the metal layer 49a, and a guide substrate 448 including an electrode 48d which is electrically connected to the metal layer 49b.

In such a point, the optical transceiver 440 according to the fifth embodiment is different from the optical transceiver 40 according to the first embodiment described above. The other configuration may be identical to that of the optical transceiver 40 according to the first embodiment described above. Such an optical transceiver 440 is mounted over the package substrate 20, and similar to the example of FIGS. 1A to 1C described above, the package substrate 20 is mounted over the board 10 by using the bump 80.

The conductive pattern 42f of the optical waveguide chip 442, for example, is formed by using a photolithography technology, an etching technology, a film forming technology, a liftoff technology, or the like, similar to the metal layer 49a. The conductive pattern 42f, for example, is electrically connected to the element region 42c in which the optical modulator and the photo detector are disposed.

The electrode 48d of the guide substrate 448 is formed in a position corresponding to the metal layer 49b by using a through silicon via (TSV) technology, a boring technology, a conductor filling technology, or the like according to the material of the guide substrate 448.

The guide substrate 448, for example, is a semiconductor chip such as LSI. In this case, the groove (48a) pressing the lens 46 is disposed in a surface side of a semiconductor substrate used in the semiconductor chip which faces the optical waveguide chip 442, and a circuit which includes a transistor, a wiring layer, and the like and has a predetermined electrical processing function is formed in a surface side opposite to the surface side described above. Such a circuit is electrically connected to the optical waveguide chip 442 through the electrode 48d, the metal layers 49a and 49b (49), and the conductive pattern 42f. In the semiconductor chip which is the guide substrate 448, for example, a driver chip including a driver circuit controlling the optical waveguide chip 442 may be used.

The optical transceiver 440 may be assembled by using the optical waveguide chip 442 and the guide substrate 448 described above, similar to the example in which the optical transceiver 40 is assembled by using the optical waveguide chip 42 and the guide substrate 48 described in the first embodiment described above (FIG. 8A to FIG. 11B).

As in the optical transceiver 440 described above, the guide substrate 448 pressing the lens 46 may be a semiconductor chip having a predetermined electrical processing function.

For example, the guide substrate 448 is the semiconductor chip, and thus it is possible to highly functionalize the optical transceiver 440. The semiconductor chip of the guide substrate 448 may be electrically connected to the sub package substrate 41 through the optical waveguide chip 442. In addition, for example, when the driver chip 43 is omitted and the processing function of the driver chip 43 is included in the semiconductor chip of the guide substrate 448, it is possible to reduce a component mounting area on the sub package substrate 41.

Furthermore, a method as described in the fifth embodiment in which the guide substrate 448 is the semiconductor chip having a predetermined electrical processing function may be similarly applied the guide substrate 148, the guide substrate 248, and the guide substrate 348 as described in the second embodiment to the fourth embodiment.

Figure 17:
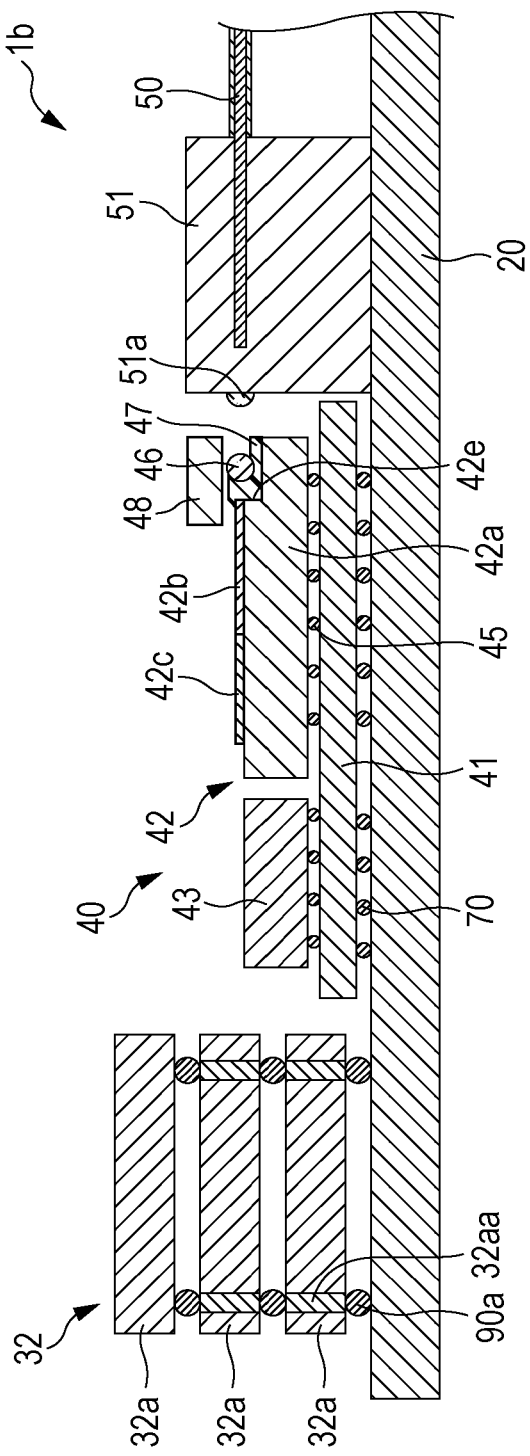
FIG. 17 is an explanatory diagram of one example of an optical device according to a sixth embodiment.

FIG. 17 is an explanatory diagram of one example of an optical device according to a sixth embodiment. Here, FIG. 17 is a schematic cross-sectional view of a main part of one example of the optical device according to the sixth embodiment.

An optical device 1b illustrated in FIG. 17 is different from the optical device 1 according to the first embodiment described above in that a semiconductor device 32 in which a plurality of semiconductor chips 32a is laminated is mounted over the package substrate 20. The other configuration may be identical to that of the optical device 1 according to the first embodiment described above.

The semiconductor device 32 is a so-called three-dimensional laminated (3D) device, and herein, as one example, the semiconductor device 32 including three semiconductor chips 32a which are laminated is illustrated. In the three semiconductor chips 32a, a memory chip such as a dynamic random access memory (DRAM) may be included. For example, among the semiconductor chips 32a, a conductive section 32aa which allows electrical continuity between a front surface and a back surface thereof is disposed in the semiconductor chips 32a of a lower layer and an intermediate layer by using a TSV technology or the like. The semiconductor chips 32a which are laminated up and down are electrically connected to each other through a bump 90a such as a solder bump or a copper (Cu) pillar, and the conductive section 32aa.

Furthermore, the semiconductor device 32 having such a 3D structure may be disposed over the package substrate 20 instead of the semiconductor device 30 described in the first embodiment described above, and the semiconductor device 32 having such a 3D structure may be disposed along with the semiconductor device 30.

Thus, the semiconductor device 32 having a structure in which the plurality of semiconductor chips 32a is laminated may be mounted over the package substrate 20.

In such an optical device 1b described above, the semiconductor device 32 includes the plurality of semiconductor chips 32a which are laminated, and thus an electrical signal is transmitted in a laminating (up and down) direction. When a cooling mechanism suppressing overheating of the semiconductor device 32, for example, is arranged on the semiconductor device 32, or between the upper semiconductor chips 32a and the lower semiconductor chips 32a, the optical transceiver 40 including an I/O for optical interconnection is disposed over the side of the semiconductor device 32.

In this case, from a viewpoint of reducing electrical wiring between the semiconductor device 32 and the optical transceiver 40, it is preferable that the optical transceiver 40 is arranged in the vicinity of the semiconductor device 32, but the produced heat of the semiconductor device 32 easily affects the optical transceiver 40 as the optical transceiver 40 is arranged to be closer to the semiconductor device 32. As described above, in the optical transceiver 40, a positional deviation in the lens 46 according to thermal expansion in the resin 47 due to this adjacent produced heat is effectively suppressed by the guide substrate 48.

In addition, as described above, in the optical transceiver 40, the lens 46 is suitably positioned by the guide substrate 48, a positional deviation thereof is suppressed, and thus it is possible to simply perform optical coupling with respect to the optical fiber 50 using the lens 46 by suppressing an increase in the cost.

Furthermore, the semiconductor device 32 having a 3D structure as described in the sixth embodiment may be mounted over the package substrate 20 described in the second embodiment to the fifth embodiment described above instead of the semiconductor device 30, or may be mounted over the package substrate 20 along with the semiconductor device 30.

As described above, the first embodiment to the sixth embodiment are described. In the first embodiment to the sixth embodiment, the lens or the optical fiber is suitably positioned by the guide substrate, and a positional deviation is suppressed. The method as described in the first embodiment to the sixth embodiment described above may be similarly applied to the arrangement of various optical components such as a mirror, a prism, and a coupler in addition to the lens or the optical fiber. The groove (the concave section) provided for arranging the optical component in the optical waveguide chip is not limited to the optical waveguide chip end, but the disposing section may be suitably changed based on the type of optical component to be arranged, a substrate material of the optical waveguide chip, the wavelength of light to be transmitted, and the like.

In addition, the method as described in the first embodiment to the sixth embodiment described above is not limited to the optical waveguide chip which is formed by using a silicon photonics technology, but may also be similarly applied to an optical waveguide chip using an inorganic material such as quartz and an optical waveguide chip using an organic material such as polyimide. Further, as the optical waveguide, a single mode optical waveguide and a multimode optical waveguide may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module, comprising:
a first substrate configured to include an optical waveguide, and a first guide provided on an end surface side in an end of the optical waveguide;
a resin configured to be disposed in the first guide;
an optical component configured to be disposed on the resin; and
a second substrate configured to be jointed onto the first substrate, and to include a first groove corresponding to an end surface in a surface of the first substrate, the first groove facing the first guide, the optical component being disposed between the resin and the first groove, wherein
the first groove is parallel to and extends in an optical axis direction of the optical waveguide.

2. The optical module according to claim 1, wherein the optical component is in contact with the first groove, and an optical axis of the optical component is positioned on an optical axis of the optical waveguide.

3. The optical module according to claim 1, further comprising:
the first groove that further includes a second groove extending in an orthogonal direction of the first groove, and wherein
the optical component is disposed in an intersecting position between the first groove and the second groove.

4. The optical module according to claim 1, wherein the first guide includes a region interposed between a pair of side wall sections extending in the optical axis direction of the end surface, and
the resin and the optical component are disposed in the region.

5. The optical module according to claim 1, wherein a part of the resin is disposed between the end surface and the optical component.

6. The optical module according to claim 1, wherein the resin has elasticity.

7. The optical module according to claim 1, wherein the second substrate is a semiconductor chip which is electrically connected to the first substrate.

8. A manufacturing method of an optical module, comprising: preparing a first substrate which includes an optical waveguide, and
a first guide provided on an end surface side in an end of the optical waveguide; preparing a second substrate which includes a first groove corresponding to the end surface;
disposing a resin in the first guide; disposing an optical component on the resin; and
jointing the second substrate onto the first substrate by pressing the optical component to the resin side by the first groove, wherein
the first groove is parallel to and extends in an optical axis direction of the optical waveguide.

9. The manufacturing method of an optical module according to claim 8, wherein the disposing the optical component on the resin includes moving the optical component disposed on the resin to the end surface side and covering the end surface with a part of the resin.

10. The manufacturing method of an optical module according to claim 8, wherein the jointing the second substrate onto the first substrate includes positioning an optical axis of the optical component on an optical axis of the optical waveguide by pressing the optical component to the resin side by the first groove and by deforming the resin.

11. The manufacturing method of an optical module according to claim 8, wherein
the resin has elasticity, and
in the jointing the second substrate onto the first substrate, the optical component is pressed to the resin side against an elastic force of the resin by the first groove.

12. An optical device, comprising:
a first substrate configured to include an optical waveguide, and a first guide provided on an end surface side in an end of the optical waveguide;
a resin configured to be disposed in the first guide;
a first optical component configured to be disposed on the resin; and a second substrate configured to be jointed onto the first substrate, and
to include a first groove corresponding to an end surface in a surface of the first substrate, the first groove facing the first guide, wherein
the first optical component includes
an optical module configured to be disposed between the resin and the first groove, and
a second optical component configured to be disposed on a side of the optical module, and to be optically coupled to the end surface through the first optical component, wherein
the first groove is parallel to and extends in an optical axis direction of the optical waveguide.

13. The optical device according to claim 12, wherein
the second substrate includes a third guide which is provided on an outer surface of the second substrate, and
the second optical component includes an engaging section which is engaged to the third guide.

14. The optical device according to claim 13, wherein the second optical component includes a protruding section in contact with the second substrate in which the engaging section is engaged to the third guide.

15. The optical device according to claim 12, further comprising:
a circuit substrate having the optical module mounted thereon; and a semiconductor device mounted on the circuit substrate, and
electrically connected to the optical module through the circuit substrate.

16. The optical device according to claim 12, wherein the second substrate is a semiconductor chip which is electrically connected to the first substrate.

17. The optical module according to claim 1, wherein
the second substrate further comprises a second groove, the optical component being disposed in an intersecting position between the first groove and the second groove.

18. The optical module according to claim 12, wherein
the second substrate comprises a first groove and a second groove, the optical component being disposed in an intersecting position between a first groove and a second groove.

19. An optical module, comprising:
a first substrate configured to include an optical waveguide, and a first guide provided on an end surface side in an end of the optical waveguide;
a resin configured to be disposed in the first guide;
an optical component configured to be disposed on the resin; and
a second substrate configured to be jointed onto the first substrate, and to include a first groove corresponding to an end surface in a surface of the first substrate, the first groove facing the first guide, the optical component being disposed between the resin and the first groove, wherein
the optical component is a lens, a first face of the lens being coupled to the optical waveguide, a second surface opposite to the first face of the lens being configured to be coupled to an optical fiber.

* * * * *